United States Patent
Xie et al.

(10) Patent No.: US 11,169,703 B2
(45) Date of Patent: **\*Nov. 9, 2021**

(54) METHOD FOR DISPLAYING GRAPHICAL USER INTERFACE AND MOBILE TERMINAL

(71) Applicant: Huawei Technologies Co., Ltd., Shenzhen (CN)

(72) Inventors: Bin Xie, Shenzhen (CN); Zhenghao Guo, Shenzhen (CN); Jin Sun, Shenzhen (CN); Liang Ma, Shenzhen (CN); Brian McDermott, London (GB); Yan Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/939,715

(22) Filed: Jul. 27, 2020

(65) Prior Publication Data

US 2021/0004154 A1   Jan. 7, 2021

Related U.S. Application Data

(63) Continuation of application No. 15/533,325, filed as application No. PCT/CN2015/099000 on Dec. 25, 2015, now Pat. No. 10,725,657.

(30) Foreign Application Priority Data

Dec. 30, 2014  (CN) .......................... 201410849524.8

(51) Int. Cl.
*G06F 3/0488* (2013.01)
*G06F 1/16* (2006.01)
(Continued)

(52) U.S. Cl.
CPC ........ *G06F 3/04886* (2013.01); *G06F 1/1626* (2013.01); *G06F 1/1677* (2013.01);
(Continued)

(58) Field of Classification Search
None
See application file for complete search history.

(56) References Cited

U.S. PATENT DOCUMENTS

2007/0262965 A1   11/2007   Hirai et al.
2009/0295753 A1   12/2009   King et al.
(Continued)

FOREIGN PATENT DOCUMENTS

CN   101010661 A   8/2007
CN   102654815 A   9/2012
(Continued)

*Primary Examiner* — Stephen T. Reed
(74) *Attorney, Agent, or Firm* — Conley Rose, P.C.

(57) ABSTRACT

A method for displaying a graphical user interface (GUI), which relate to the data processing field, includes determining whether a display screen of the mobile terminal is shielded, when the display screen is shielded, determining a shielded area and a display area of the display screen, where the display area is used to display a GUI, determining parameter information of the display area, and obtaining, according to the parameter information, a GUI that matches the display area, and displaying the GUI in the display area.

20 Claims, 13 Drawing Sheets

(51) Int. Cl.
  *G06F 3/0482*  (2013.01)
  *G06F 3/0487*  (2013.01)
  *H04M 1/72454*  (2021.01)
  *G06F 3/0481*  (2013.01)
  *H04W 12/02*  (2009.01)
  *H04W 88/02*  (2009.01)

(52) U.S. Cl.
  CPC .......... *G06F 3/0481* (2013.01); *G06F 3/0482* (2013.01); *G06F 3/0487* (2013.01); *H04M 1/72454* (2021.01); *H04W 12/02* (2013.01); *G06F 2200/1634* (2013.01); *H04M 2250/12* (2013.01); *H04W 88/02* (2013.01)

(56) References Cited

U.S. PATENT DOCUMENTS

| | | |
|---|---|---|
| 2012/0032979 A1 | 2/2012 | Blow et al. |
| 2012/0072167 A1 | 3/2012 | Cretella, Jr. et al. |
| 2013/0222323 A1 | 8/2013 | McKenzie |
| 2014/0176503 A1 | 6/2014 | Guo |
| 2014/0198057 A1* | 7/2014 | Xia .............. G06F 3/04883 345/173 |
| 2014/0274214 A1 | 9/2014 | Kim |
| 2015/0026623 A1* | 1/2015 | Horne ........... G06F 3/04883 715/771 |

FOREIGN PATENT DOCUMENTS

| | | |
|---|---|---|
| CN | 103052937 A | 4/2013 |
| CN | 103747134 A | 4/2014 |
| CN | 103885642 A | 6/2014 |
| CN | 103914208 A | 7/2014 |
| CN | 103941977 A | 7/2014 |
| CN | 104049839 A | 9/2014 |
| CN | 104423917 A | 3/2015 |
| EP | 1418735 A2 | 5/2004 |
| EP | 2677390 A2 | 12/2013 |
| EP | 2757459 A1 | 7/2014 |
| EP | 2778831 A1 | 9/2014 |
| JP | 2006211019 A | 8/2006 |

* cited by examiner

METHOD FOR DISPLAYING GRAPHICAL USER INTERFACE AND MOBILE TERMINAL

CROSS-REFERENCE TO RELATED APPLICATIONS

This application is a continuation of U.S. patent application Ser. No. 15/533,325 filed on Jun. 5, 2017, now U.S. Pat. No. 10,725,657, which is a U.S. National Stage of International Patent Application No. PCT/CN2015/099000 filed on Dec. 25, 2015, which claims priority to Chinese Patent Application No. 201410849524.8 filed on Dec. 30, 2014. All of the aforementioned patent applications are hereby incorporated by reference in their entireties.

TECHNICAL FIELD

The present disclosure relates to the data processing field, and in particular, to a method for displaying a graphical user interface and a mobile terminal.

BACKGROUND

With rapid development of information technologies, display screens of various mobile terminals such as a mobile phone and a tablet computer are increasingly large. To protect a display screen of a mobile terminal, increasing users use a protective case with a screen protection assembly. However, when various application programs in an existing mobile terminal are in a running process, an application interface is usually displayed in full screen. Therefore, when using the mobile terminal, a user needs to open a protective case before the user can view a currently running application interface and perform an operation on the application interface on the display screen.

In the other approaches, an application interface of a mobile terminal is displayed in full screen, therefore, after a protective case is opened, leakage of information displayed on the application interface is easily caused, which degrades security of the mobile terminal.

SUMMARY

To resolve the foregoing technical problem, embodiments of the present disclosure provide a method for displaying a graphical user interface on a mobile terminal and a mobile terminal. Technical solutions are as follows.

According to a first aspect, a technical solution provides a method for displaying a graphical user interface, where the method includes determining whether a display screen of the mobile terminal is shielded, when the display screen is shielded, determining a shielded area and a display area of the display screen, where the display area is used to display a graphical user interface, determining parameter information of the display area, where the parameter information includes an area size of the display area and a position of the display area in the display screen, and obtaining, according to the parameter information, a graphical user interface that matches the display area, and displaying the graphical user interface in the display area.

In the foregoing technical solution, a graphical user interface of an application can be displayed only in a display area of a display screen, and does not need to be displayed in full screen, which reduces a possibility of information leakage and ensures better privacy.

With reference to the first aspect, in a first implementation manner of the first aspect, determining whether a display screen of the mobile terminal is shielded includes detecting an ambient light intensity using a light sensor disposed on the mobile terminal, and determining whether the display screen is shielded according to whether a change value of the ambient light intensity is greater than a preset change threshold.

With reference to the first aspect, in a second implementation manner of the first aspect, two groups of light sensors configured to detect an ambient light intensity are disposed on the mobile terminal: a first group of light sensors and a second group of light sensors, and determining whether a display screen of the mobile terminal is shielded includes determining whether ambient light intensities detected by the first group of light sensors are less than ambient light intensities detected by the second group of light sensors at the same time.

With reference to the first implementation manner or the second implementation manner of the first aspect, in a third implementation manner of the first aspect, determining a shielded area and a display area of the display screen includes determining an area whose ambient light intensity is greater than or equal to a preset first threshold and that is in the display screen as a display area, and determining an area whose ambient light intensity is less than the preset first threshold and that is in the display screen as a shielded area.

With reference to the first aspect, in a fourth implementation manner of the first aspect, determining whether a display screen of the mobile terminal is shielded further includes detecting, using a pressure sensor disposed on the mobile terminal, whether a pressure value applied on the display screen is greater than or equal to a preset pressure threshold, to determine whether the display screen of the mobile terminal is shielded.

With reference to the fourth implementation manner of the first aspect, in a fifth implementation manner of the first aspect, determining a shielded area and a display area of the display screen further includes determining an area whose pressure value applied on the display screen is greater than or equal to a preset second threshold as a shielded area, and determining an area whose pressure value applied on the display screen is less than the preset second threshold as a display area.

With reference to any one of the first aspect, or the first to the fifth implementation manners of the first aspect, in a sixth implementation manner of the first aspect, before determining whether a display screen of the mobile terminal is shielded, the method further includes detecting whether the display screen is lighted up.

With reference to any one of the first aspect, or the first to the sixth implementation manners of the first aspect, in a seventh implementation manner of the first aspect, a graphical user interface displayed in the display area is a graphical user interface that is of an application and that is displayed on the display screen before the display screen is shielded.

With reference to any one of the first aspect, or the first to the seventh implementation manners of the first aspect, in an eighth implementation manner of the first aspect, obtaining, according to the parameter information, a graphical user interface that matches the display area includes obtaining, according to a display area position in the parameter information, a graphical user interface of an application program corresponding to the display area position, or obtaining, according to a display area size in the parameter information, a graphical user interface of a window widget corresponding to the display area size.

According to a second aspect, a technical solution provides a mobile terminal, including a display screen, where the mobile terminal further includes a judging module configured to determine whether the display screen of the mobile terminal is shielded, a determining module configured to when the judging module determines that the display screen is shielded, determine a shielded area and a display area of the display screen, where the display area is used to display a graphical user interface, and the determining module is further configured to determine parameter information of the display area, where the parameter information includes an area size of the display area and a position of the display area in the display screen, and a display module configured to obtain, according to the parameter information in the determining module, a graphical user interface that matches the display area, and display the graphical user interface in the display area.

With reference to the second aspect, in a first implementation manner of the second aspect, the mobile terminal further includes a sensor module, where the sensor module is connected to the judging module, and that the judging module determines whether the display screen of the mobile terminal is shielded includes detecting, by the sensor module, an ambient light intensity, and determining, by the judging module, whether the display screen is shielded according to whether a change value of the ambient light intensity is greater than a preset change threshold.

With reference to the second aspect or the first implementation manner of the second aspect, in a second implementation manner of the second aspect, that the determining module determines the shielded area and the display area of the display screen includes determining, by the determining module, an area whose ambient light intensity is greater than or equal to a preset first threshold and that is in the display screen as a display area, and determining an area whose ambient light intensity is less than the preset first threshold and that is in the display screen as a shielded area.

With reference to any one of the second aspect, or the first to the second implementation manners of the second aspect, in a third implementation manner of the second aspect, a graphical user interface displayed in the display area is a graphical user interface that is of an application and that is displayed on the display screen before the display screen is shielded.

According to a third aspect, a technical solution provides another mobile terminal, where the mobile terminal includes a touchscreen and a central processing unit (CPU), and the CPU determines whether the touchscreen of the mobile terminal is shielded, when determining that the touchscreen is shielded, the CPU determines a shielded area and a display area of the touchscreen, where the display area is used to display a graphical user interface, the CPU determines parameter information of the display area, where the parameter information includes an area size of the display area and a position of the display area in the touchscreen, and the CPU obtains, according to the parameter information, a graphical user interface that matches the display area, and displays the graphical user interface in the display area of the touchscreen.

With reference to the third aspect, in a first implementation manner of the third aspect, the mobile terminal further includes a light sensor array, where the light sensor array is connected to the CPU, and that the CPU determines whether the touchscreen of the mobile terminal is shielded is further detecting, by the light sensor array, an ambient light intensity, and determining, by the CPU, whether the touchscreen is shielded according to whether a change value of the ambient light intensity is greater than a preset change threshold.

With reference to the first implementation manner of the third aspect, in a second implementation manner of the third aspect, that the CPU determines the shielded area and the display area of the touchscreen includes determining, by the CPU, an area whose ambient light intensity is greater than or equal to a preset first threshold as a display area in the touchscreen, and determining an area whose ambient light intensity is less than the preset first threshold as a shielded area in the touchscreen.

With reference to the third aspect, in a third implementation manner of the third aspect, the mobile terminal further includes a pressure sensor array, where the pressure sensor array is connected to the CPU, and that the CPU determines whether the touchscreen of the mobile terminal is shielded includes detecting, by the pressure sensor array, a pressure value applied on the touchscreen, and determining, by the CPU, whether the touchscreen of the mobile terminal is shielded according to whether the pressure value is greater than a preset pressure threshold.

With reference to the third aspect, in a fourth implementation manner of the third aspect, that the CPU determines the shielded area and the display area of the touchscreen includes determining, by the CPU, an area whose pressure value applied on the touchscreen is greater than or equal to a preset second threshold as a shielded area, and determining an area whose pressure value applied on the touchscreen is less than the preset second threshold as a display area.

With reference to any one of the third aspect, or the first to the fourth implementation manners of the third aspect, in a fifth implementation manner of the third aspect, a graphical user interface displayed in the display area is further a graphical user interface that is of an application and that is displayed on the touchscreen before the touchscreen is shielded.

According to a fourth aspect, a technical solution provides a mobile terminal, where the mobile terminal includes the mobile terminal includes one or more processors, a display, a storage apparatus, and one or more programs, the one or more programs are stored in the storage apparatus and are configured to be executed by the one or more processors, and the one or more programs include determining whether the display is shielded, when the display is shielded, determining a shielded area and a display area of the display, where the display area is used to display a graphical user interface, determining parameter information of the display area, where the parameter information includes an area size of the display area and a position of the display area in the display, and obtaining, according to the parameter information, a graphical user interface that matches the display area, and displaying the graphical user interface in the display area.

According to a fifth aspect, a technical solution provides a method for displaying a graphical user interface, where the method includes obtaining, by a mobile terminal, a folding type of a screen protection assembly and parameter information of the folding type, obtaining, by the mobile terminal, an application interface that matches the screen protection assembly, and storing the application interface in a local database, detecting, by the mobile terminal, an unshielded area on a screen, obtaining, by the mobile terminal, parameter information of the unshielded area, obtaining, by the mobile terminal, a quantity of applications corresponding to the unshielded area and an application identifier of each application, obtaining, by the mobile terminal according to the parameter information of the unshielded area, the quantity of applications, and the application identifier of the application, an application interface display structure that matches the unshielded area, and displaying, by the mobile terminal according to the application interface display structure, an application interface that matches the unshielded area.

The technical solutions provided in the embodiments of the present disclosure bring the following beneficial effects.

An unshielded area on a screen is detected, and an application interface that matches the unshielded area is displayed such that the application interface can be displayed only in the unshielded area on the screen, and does not need to be displayed in full screen, which reduces a possibility of information leakage and ensures better privacy.

BRIEF DESCRIPTION OF DRAWINGS

To describe the technical solutions in some of the embodiments of the present disclosure more clearly, the following briefly introduces the accompanying drawings describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

The terms used in the embodiments of the present disclosure are merely for the purpose of illustrating specific embodiments, and are not intended to limit the present disclosure. The terms "a" and "the" of singular forms used in the embodiments and the appended claims of the present disclosure are also intended to include plural forms, unless otherwise specified in the context clearly. It should also be understood that, the term "and/or" used herein indicates and includes any or all possible combinations of one or more associated listed items.

It should be understood that although terms such as "first", "second", and "third" may be used in the embodiments of the present disclosure to describe various preset thresholds, the thresholds should not be limited by these terms. These terms are merely used to distinguish between the various preset thresholds. For example, without departing from the scope of the embodiments of the present disclosure, a first threshold may also be referred to as a second threshold, similarly, a second threshold may also be referred to as a first threshold.

Depending on the context, as used herein, the word "if" may be construed as "at the time of . . . ", "when . . . ", "in response to determining", or "in response to detecting". Similarly, depending on the context, the phrase "if it is determined" or "if detecting (a described condition or event)" may be construed as "when determining", "in response to determining", "when detecting (the described condition or event)", or "in response to detecting (the described condition or event)".

It should be noted that when an element is described as "fastened to" or "disposed on" another element, the element may be directly on the other element, or a mediate element may also exist, when an element is described as "connected to" another element, the element may be directly connected to the other element, or a mediate element may also exist.

It should be further noted that orientation terms such as left, right, upper, lower, and middle in the embodiment are only relative concepts or relative to a normal usage state of a product, and should not be considered limiting.

In this specification, a mobile terminal includes, but is not limited to, a mobile phone, a tablet computer, a notebook computer, or a wearable electronic device (for example, a smart watch that can implement communication).

Figure 1:
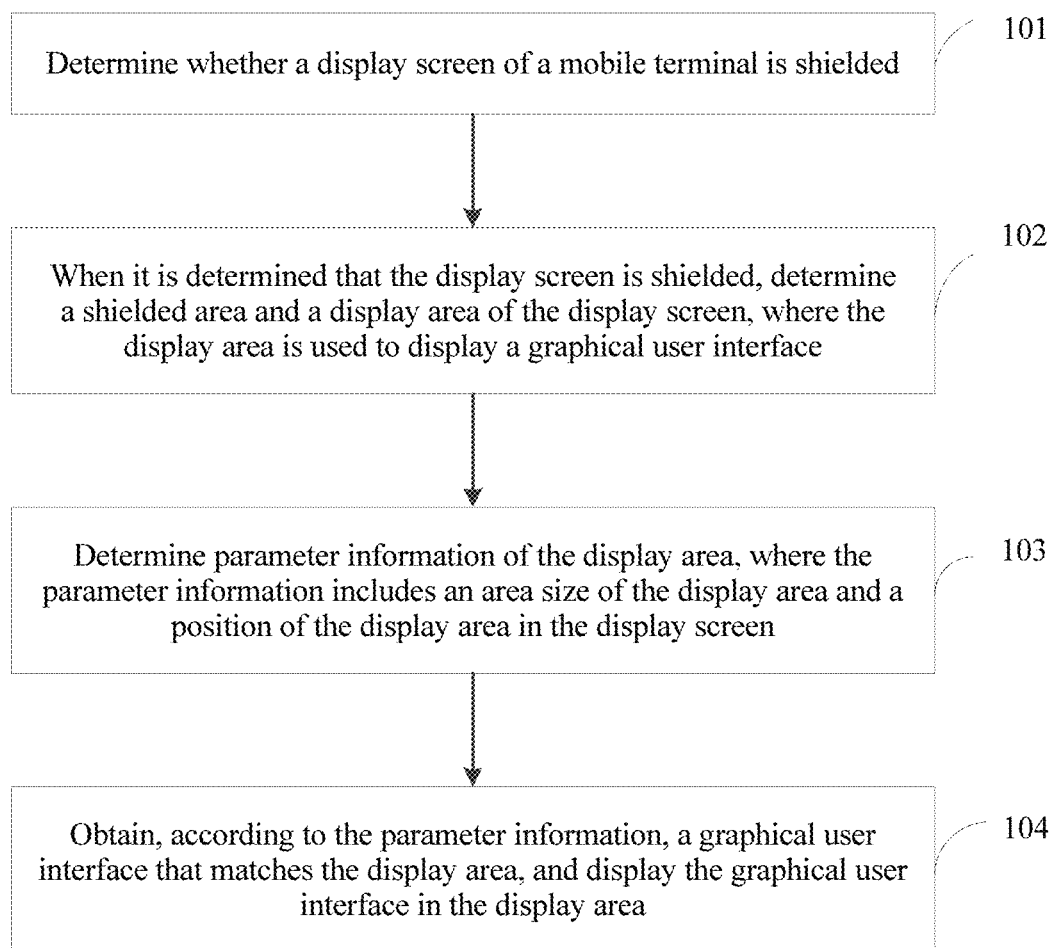
FIG. 1 is a flowchart of a method according to an embodiment of the present disclosure.

Referring to FIG. 1, an embodiment shown in FIG. 1 provides a method for displaying a graphical user interface of a mobile terminal. The method includes the following steps.

Step 101: The mobile terminal determines whether a display screen is shielded.

In this embodiment of the present disclosure, the display screen of the mobile terminal is a component that displays a graphical user interface to a user such that the mobile terminal can perform better human-machine interaction with the user. It may be understood that, in the art, the display screen of the mobile terminal may be various types of display screens, such as a resistive touch display screen, a capacitive touch display screen, and a pressure-sensitive display screen. These display screens have a common feature, that is, these display screens notify the user of relevant information by displaying a graphical user interface to the user. "Shield" means that a part of the display screen of the mobile terminal is covered by an obstruction, which causes a case in which the user cannot see covered display content. For example, a display area of 30% of a display screen of a tablet computer is covered by a book, or a display area of 40% of a display screen of a mobile phone is covered by a palm (one palm or two palms) of a user, which may be considered that the display screen of the mobile terminal is shielded by an obstruction (such as a book or a palm). Certainly, in a normal operation process of the mobile terminal, the user uses a finger to tap the display screen or slide on the display screen. The normal operation essentially makes a part of the display screen of the mobile terminal covered by a moving figure. This embodiment may also include this case.

However, it may be understood that to distinguish the normal operation (such as tap or slide) performed on the display screen by a figure of the user, a preset threshold may be set on the mobile terminal. When an area of the display screen of the mobile terminal covered by an obstruction exceeds the preset threshold, the mobile terminal may determine that the display screen is shielded.

There are multiple technical solutions in which the mobile terminal determines whether the display screen is shielded.

Optionally, for example, a light sensor may be disposed on the mobile terminal. The light sensor may be disposed on a frame that is on a same side with the display screen of the mobile terminal. Whether the display screen is shielded is determined according to an ambient light data result collected by the light sensor. A person of ordinary skill in the art may learn that the light sensor is an optoelectronic sensor, which is an apparatus that converts an optical signal into an electrical signal and finally outputs a voltage signal.

Figure 2:
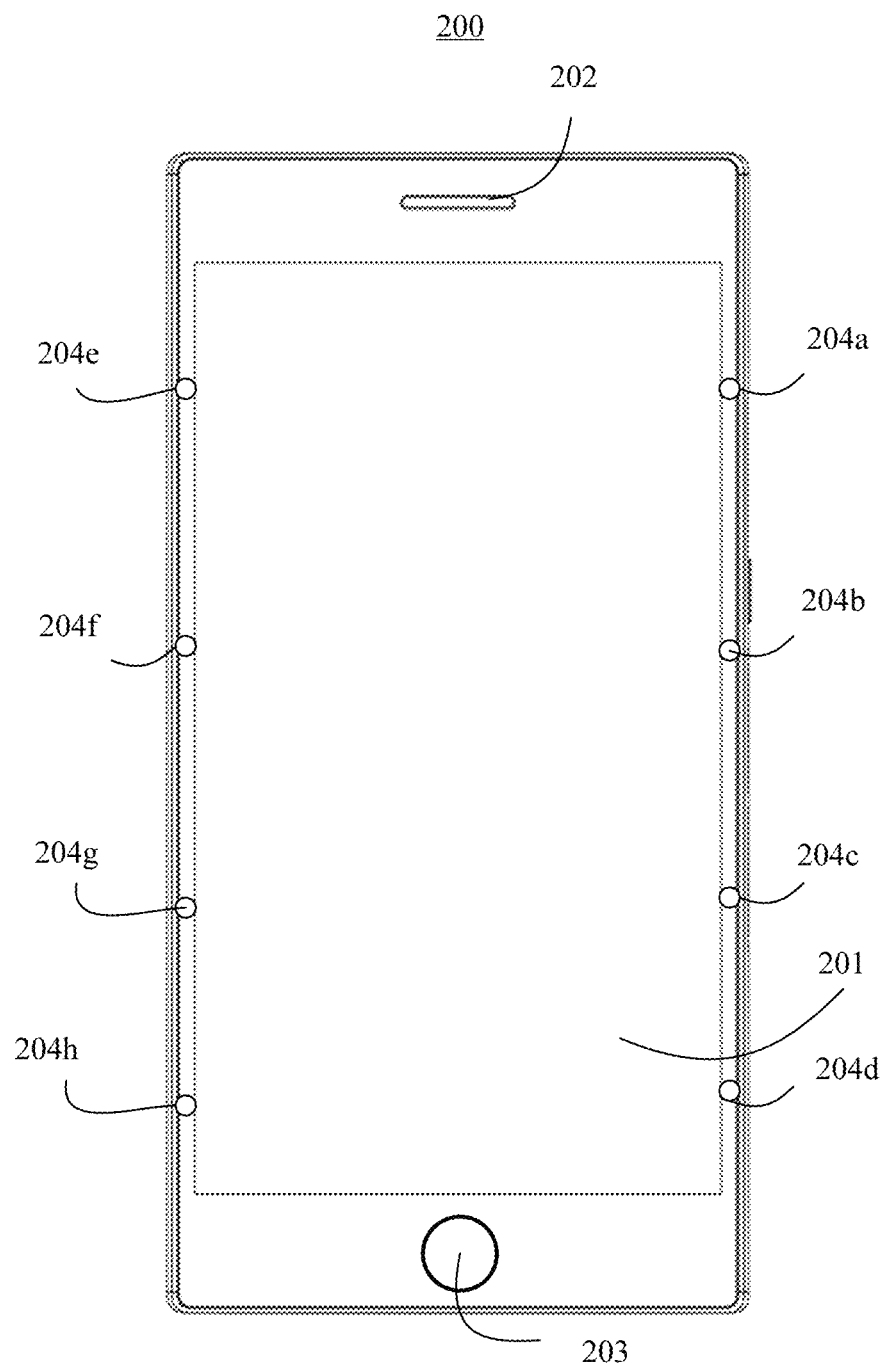
FIG. 2 is a schematic diagram of a structure of a mobile terminal according to an embodiment of the present disclosure.

Further, multiple light sensors may be disposed on a front side of the mobile terminal. As shown in FIG. 2, a front side of a mobile phone 200 includes a rectangular display screen 201, an earpiece 202, an optical push-button 203, and multiple light sensors disposed on the frame (as shown in FIG. 2, 204a, 204b, 204c, 204d, 204e, 204f, 204g, and 204h are light sensors). The light sensors detect an ambient light intensity in real time, and output a voltage signal using an analog to digital converter, or may change, according to change of the ambient light intensity, a voltage value of the electrical signal output by the light sensors. After receiving ambient light voltage data collected by the light sensors, a processor of the mobile terminal determines, according to a voltage change, whether the display screen is shielded.

Optionally, two groups of light sensors configured to detect an ambient light intensity may be disposed on the mobile terminal: a first group of light sensors and a second group of light sensors, and determining whether a display screen of the mobile terminal is shielded may include determining whether ambient light intensities detected by the first group of light sensors are less than ambient light intensities detected by the second group of light sensors at the same time.

Figure 3A:
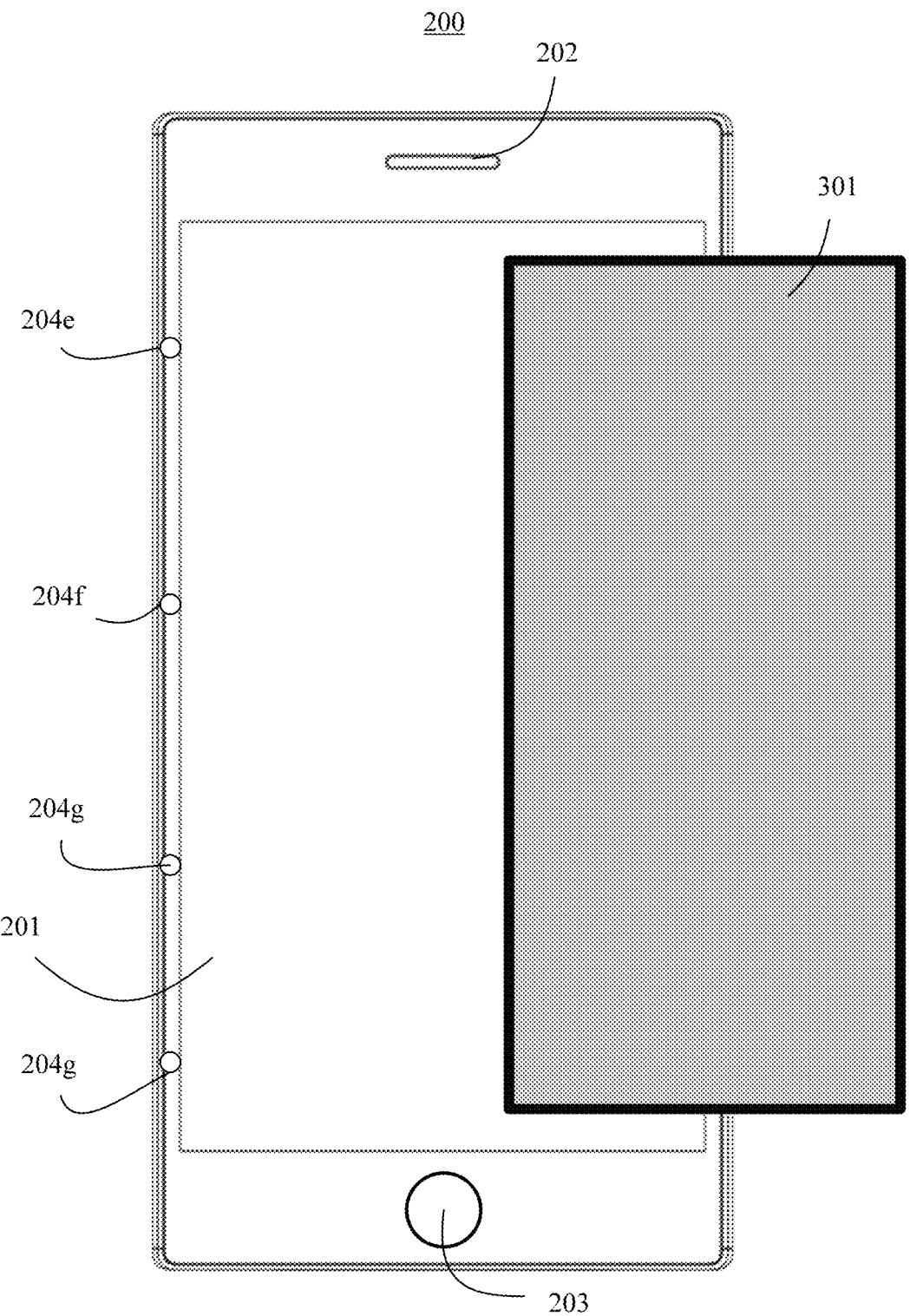
FIG. 3A, FIG. 3B, and FIG. 3C are schematic diagrams of a mobile terminal shielded by obstructions according to an embodiment of the present disclosure.
Figure 3B:
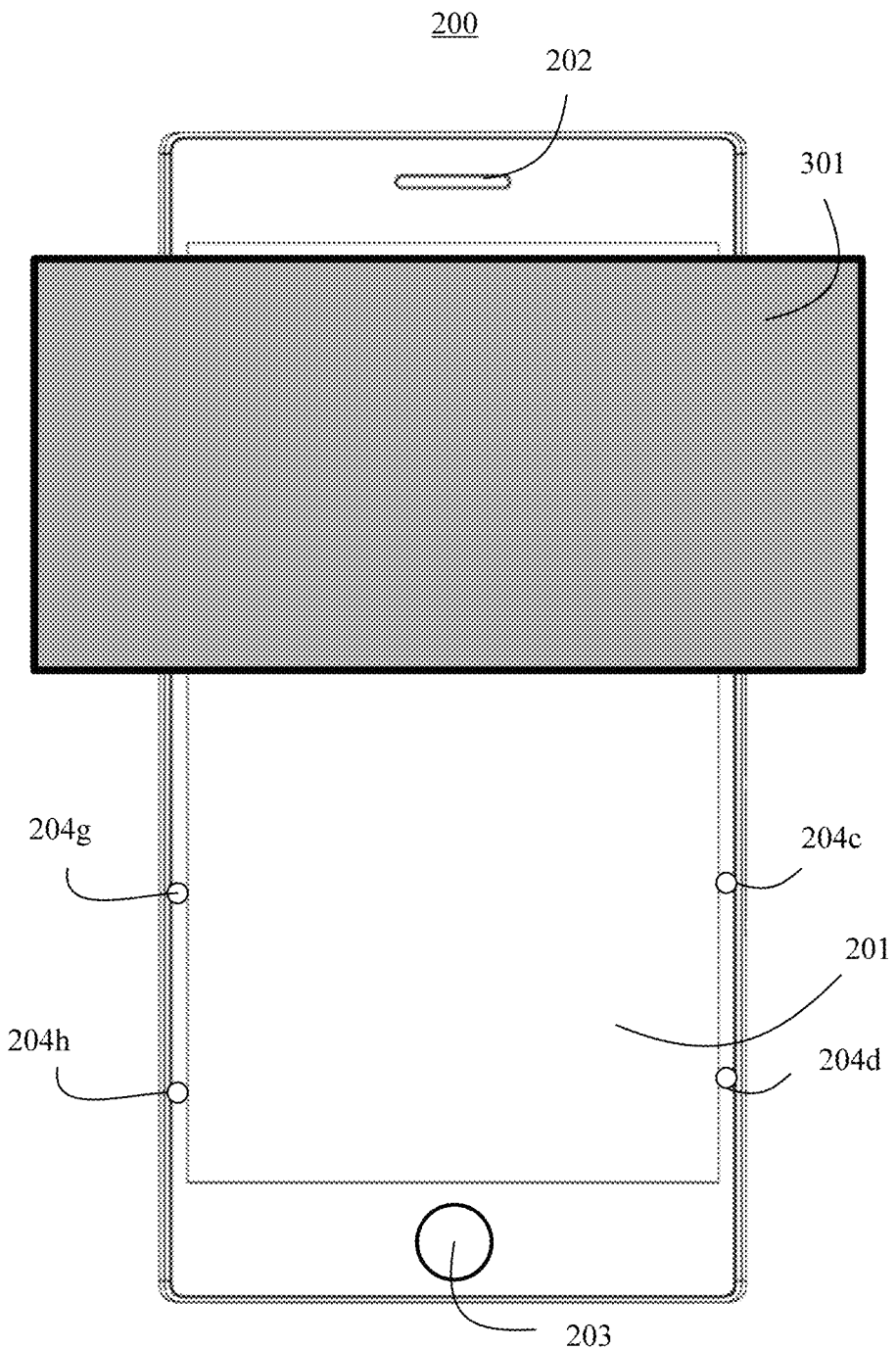

For example, at the same time, ambient light intensities collected by light sensors (204a, 204b, 204c, and 204d) are respectively 0.1 volts (V), 0.15 V, 0.18 V, and 0.2 V, which are referred to as a first group of ambient light intensities, and ambient light intensities collected by light sensors (204e, 204f, 204g, and 204h) are respectively 0.8 V, 0.85 V, 0.9 V, and 0.95 V. It can be learned from the foregoing that the first group of ambient light intensities is less than a second group of ambient light intensities. Therefore, it may be determined that a right part of the display screen of the mobile terminal is shielded by an obstruction. As shown in FIG. 3A, the first group of ambient light intensities collected by the light sensors (204a, 204b, 204c, and 204d) that are covered by an obstruction 301 (which may be a book or a palm of a user) is much less than the second group of ambient light intensities collected by the light sensors (204e, 204f, 204g, and 204h) that are not shielded by the obstruction 301. Therefore, it may be determined that a right part of the display screen of the mobile terminal is shielded by an obstruction. As shown in FIG. 3B, a third group of ambient light intensities collected by light sensors (204a, 204b, 204e, and 204f) that are covered by the obstruction 301 (which may be a book or a palm of a user) is less than a fourth group of ambient light intensities collected by light sensors (204c, 204d, 204g, and 204h) that are not shielded by the obstruction 301. Therefore, it may be determined that a right part of the display screen of the mobile terminal is shielded by an obstruction.

Figure 3C:
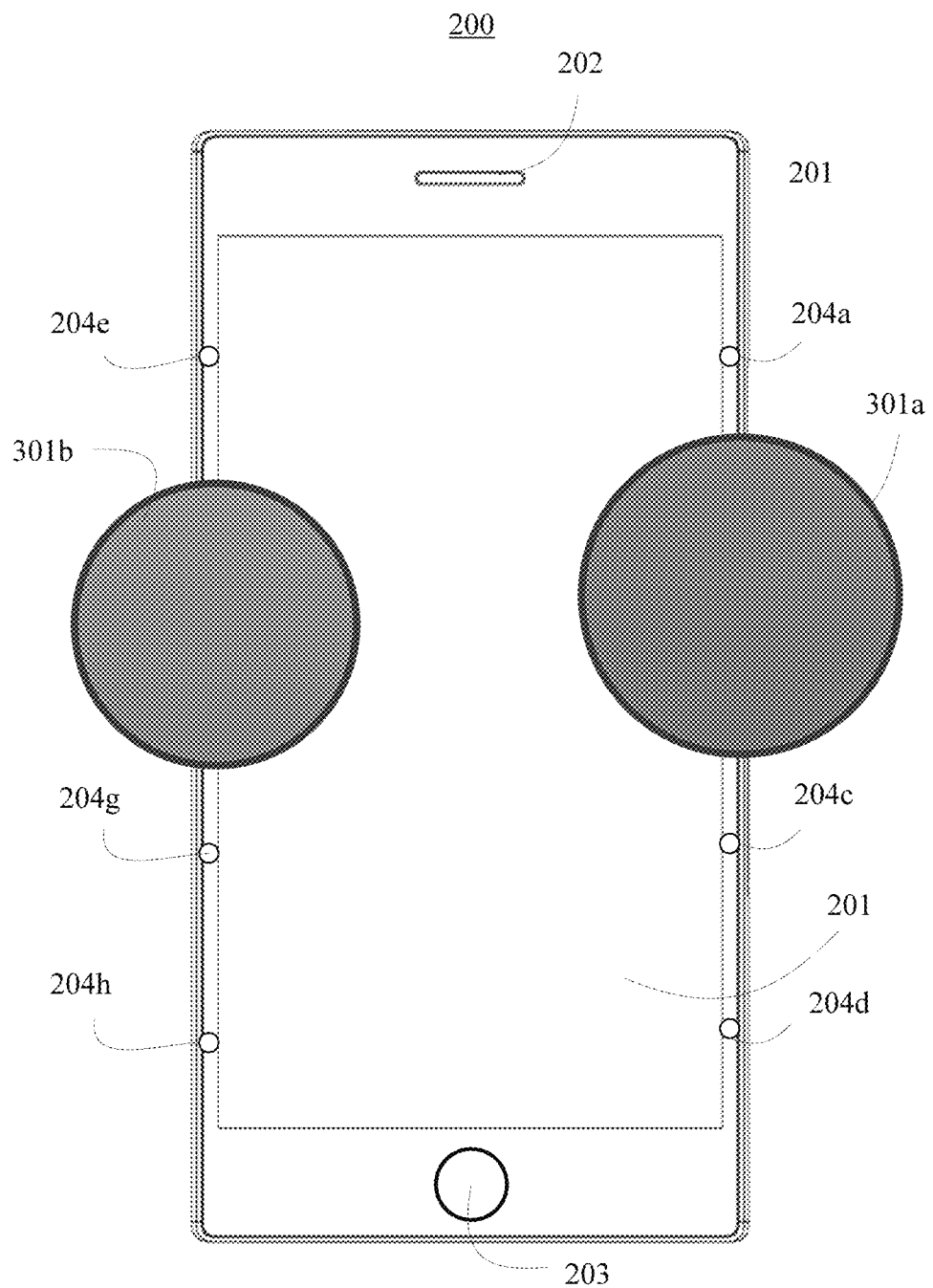

In addition, whether the display screen of the mobile terminal is shielded may also be determined according to a change value $\Delta t$ of ambient light intensities collected by light sensors, where $\Delta t$ is a change value of ambient light intensities collected by light sensors in a period of time t. When it is detected that a change value of ambient light intensities collected by several light sensors is greater than a preset threshold (which may be referred to as a change threshold), it may be determined that a display screen surrounded by the light sensors is shielded. As shown in FIG. 3C, under a normal circumstance, a value $\Delta t$ detected by light sensors (204a, 204b, 204c, 204d, 204e, 204f, 204g, and 204h) is excessively small, because ambient light does not change greatly under a specific condition. However, when an area of the display screen is covered by an obstruction, and light sensors (204f and 204b) near the area are also covered, a change value $\Delta t$ of ambient light intensities detected by the light sensors (204f and 204b) is greater than a preset change threshold, and the mobile terminal may determine a shielded area of the display screen.

It may be understood that to make the technical solution of this embodiment more complete and accurate, more light sensors disposed on the frame of the mobile terminal indicate that a shielded area of the display screen can be detected more accurately. Only an exemplary description is given in the foregoing embodiment, and a quantity of light sensors is not limited in this embodiment of the present disclosure.

Optionally, a pressure sensor may be disposed on a display screen of the mobile terminal such that whether the display screen of the mobile terminal is shielded may be determined using a pressure value applied on the display screen. On the mobile terminal shown in FIG. 2, the display screen is a pressure-sensitive touchscreen.

The pressure sensor disposed on the display screen collects, in real time, a pressure value applied on the display screen. Under a normal circumstance, when a user views information displayed on the display screen, no object presses the display screen, and therefore a pressure value of the pressure sensor is null. When an object presses the display screen, a pressure value of the pressure sensor on the display screen is not null. A pressure threshold may be preset in the mobile terminal. The mobile terminal determines that the display screen is shielded only when a pressure value collected by the pressure sensor is greater than or equal to the preset pressure threshold. When a pressure value collected by the pressure sensor is less than the preset pressure threshold, the mobile terminal determines that the display screen is not shielded.

Optionally, to make detection data more accurate, multiple light sensors may be disposed on the frame of the mobile terminal, and the display screen is a pressure-sensitive touchscreen such that the mobile terminal can determine more accurately whether the display screen is shielded. For example, as shown in FIG. 3A, it is assumed that the display screen 201 is a pressure-sensitive touchscreen. The first group of ambient light intensities collected by the light sensors (204*a*, 204*b*, 204*c*, and 204*d*) that are covered by the obstruction 301 (which may be a book or a palm of a user) is much less than the second group of ambient light intensities collected by the light sensors (204*e*, 204*f*, 204*g*, and 204*h*) that are not shielded by the obstruction 301. In addition, a pressure value in an area of the obstruction 301 is greater than the preset pressure threshold. Therefore, it may be determined that a right part of the display screen of the mobile terminal is shielded by an obstruction. A specific determining method is described in detail in the technical solution of the foregoing embodiment. Details are not described herein again.

Optionally, in this embodiment of the present disclosure, before determining whether a display screen of the mobile terminal is shielded, the method may further include detecting, by the mobile terminal, whether the display screen is lighted up. That the display screen is lighted up indicates that a power supply of the mobile terminal starts to supply power to the display screen such that a graphical user interface is displayed on the display screen.

Step 102: When the mobile terminal determines that the display screen is shielded, the mobile terminal determines a shielded area and a display area of the display screen, where the display area is used to display a graphical user interface.

The mobile terminal may determine, using the foregoing technical solution (a light sensor, a pressure sensor, or the like), a shielded area of the display screen. A specific determining method is described in the foregoing.

Figure 4:
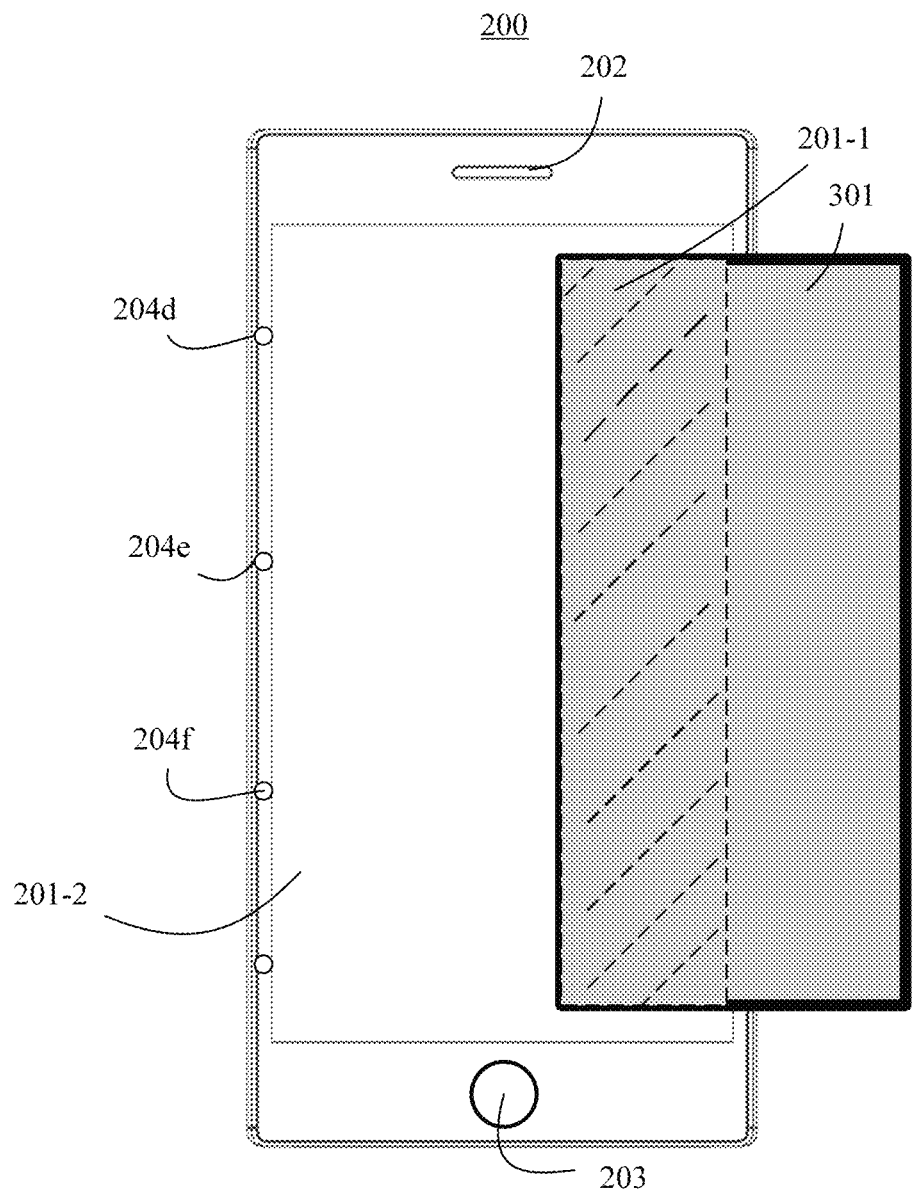
FIG. 4 is another schematic diagram of a mobile terminal shielded by an obstruction according to an embodiment of the present disclosure.

Then, the mobile terminal determines the shielded area and the display area of the display screen. The shielded area of the display screen refers to an area of the display screen that is covered by an obstruction, and the display area of the display screen refers to an area of the display screen that is not covered by the obstruction. For example, in FIG. 4, a shielded area of the display screen is an area 201-1 of the display screen indicated by a dashed line in the figure, and a display area of the display screen is an area 201-2 of the display screen that is not shielded by the obstruction 301 (that is, the remaining area of the display screen except the area indicated by a dashed line in FIG. 4). It may be understood that the area 201-1 and the area 201-2 of the display screen is a sum of areas of a graphical user interface displayed on the display screen to the user when the display screen is in a normal state (for example, the display screen is not shielded by an obstruction). The display area is used to display a graphical user interface. Further, when the mobile terminal determines that the display screen is shielded, the display area is used to display a graphical user interface of an application by the mobile terminal. The application may be an application displayed on the entire display screen before the display screen is shielded by the obstruction. A person skilled in the art may learn that because the display area is smaller than a display area of the entire display screen, the displayed graphical user interface of the application may be smaller than the graphical user interface that is of the application and that is displayed on the entire display screen before the display screen is shielded by the obstruction.

Optionally, that the mobile terminal determines a shielded area and a display area of the display screen may further include determining an area whose light intensity is greater than or equal to a preset first threshold and that is in the display screen as a display area, and determining an area whose light intensity is less than the preset first threshold and that is in the display screen as a shielded area.

Optionally, that the mobile terminal determines a shielded area and a display area of the display screen may include determining an area whose pressure value applied on the display screen is greater than or equal to a preset second threshold as a shielded area, and determining an area whose pressure value applied on the display screen is less than the preset second threshold as a display area.

Step 103: The mobile terminal determines parameter information of the display area, where the parameter information includes an area size of the display area and a position of the display area in the display screen.

When the mobile terminal determines the shielded area and the display area of the display screen, to properly display a graphical user interface in the display area, the mobile terminal needs to determine a parameter of the display area, such as an area size of the display area, and a position of the display area in the display screen. Only after the parameter information is obtained, a graphical user interface displayed in the display area can be complete. Certainly, to improve a processing speed of the mobile terminal and enhance intelligent performance of human-machine interaction of the mobile terminal, a graphical user interface displayed in the display area may also be incomplete.

Step 104: The mobile terminal obtains, according to the parameter information, a graphical user interface that matches the display area, and displays the graphical user interface in the display area.

Figure 5:
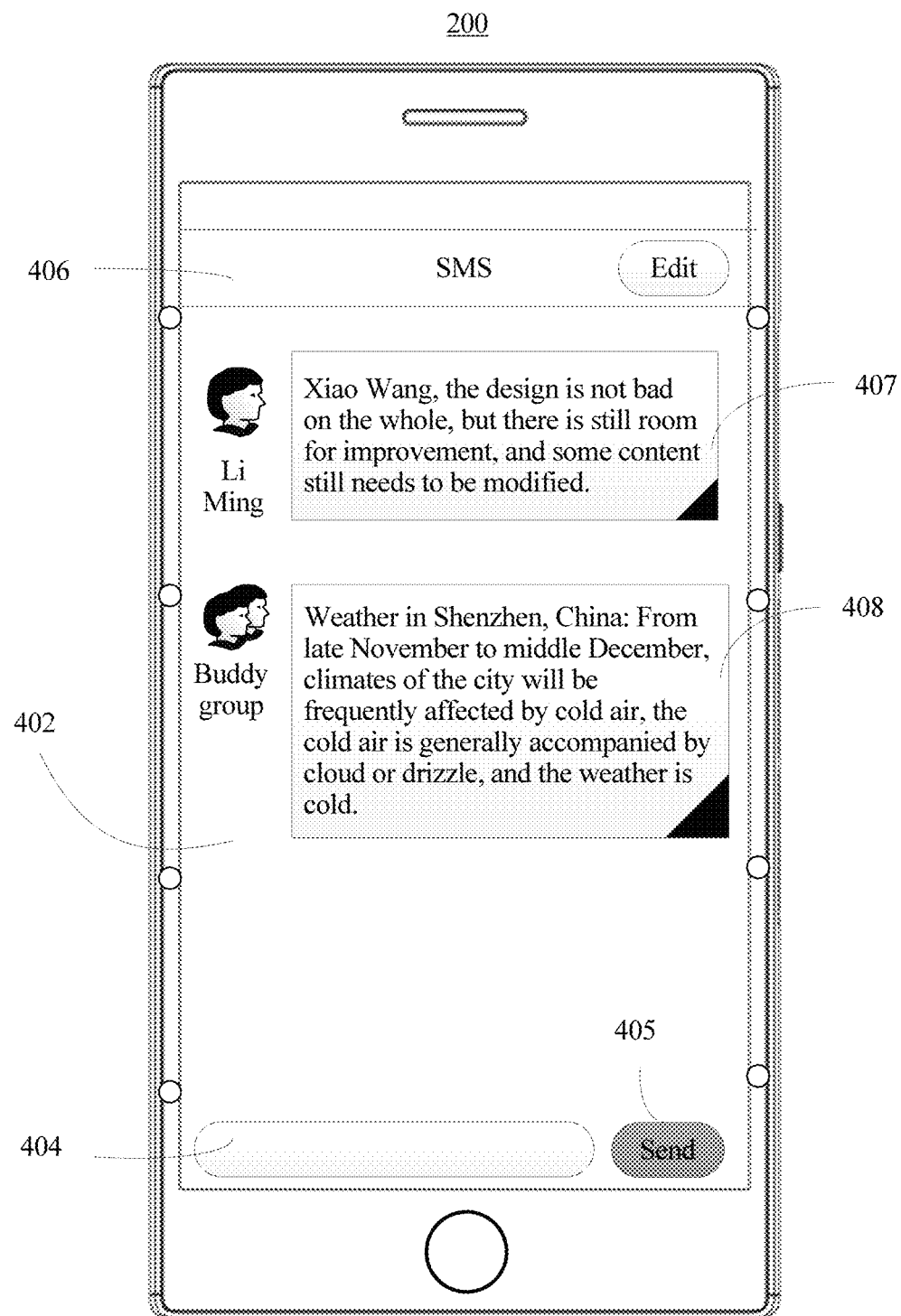
FIG. 5 is a schematic diagram of a graphical user interface of short messaging service (SMS) according to an embodiment of the present disclosure.
Figure 6:
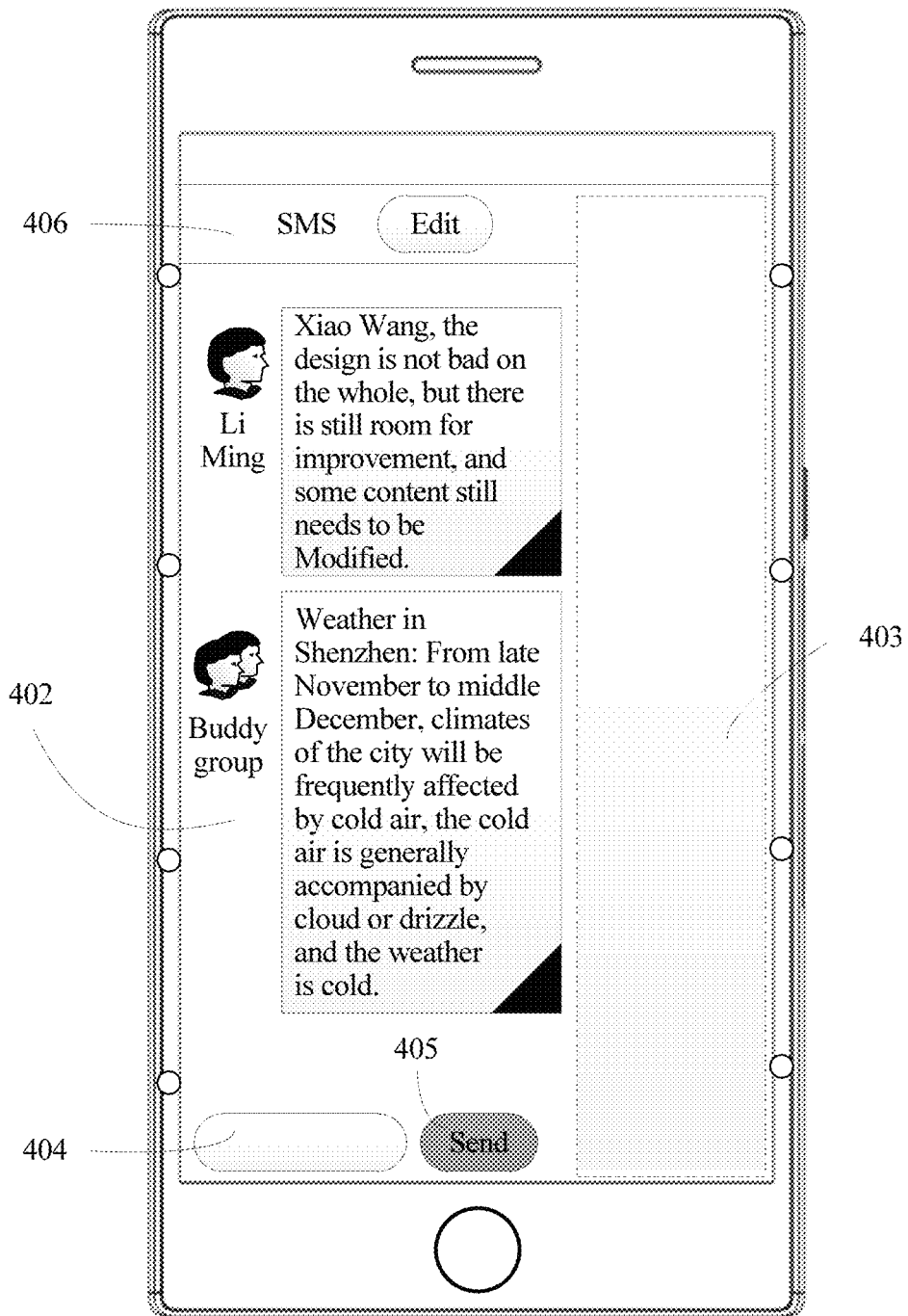
FIG. 6 is a schematic diagram of a graphical user interface of SMS of a shielded mobile terminal according to an embodiment of the present disclosure.

For example, FIG. 5 is a graphical user interface that is of an SMS application and that is displayed when the display screen of the mobile terminal is not shielded by an obstruction. There are many icon controls on the graphical user interface. An icon 406 is a status bar of the application, which is used to display a state of SMS. Icons 407 and 408 are a message box of the application, which is used to display specific content of an SMS message. An icon 404 is an input box, which is used to input text. An icon 405 is a "send" button, which is used to trigger sending of the SMS message. After it is determined, according to the technical solution of step 101 to step 103 in the foregoing method, that the display screen of the mobile terminal is shielded by an obstruction, as shown in FIG. 6, the mobile terminal determines an area 403 as a shielded area and an area 402 as a display area. To properly display the graphical user interface of the SMS application, the mobile terminal obtains, according to parameter information of the display area 402 (such as an area size of the display area and a position of the display area in the display screen), a re-designed graphical user interface that is of the SMS application and that matches the display area. "Properly display" described in this embodiment indicates that after the display screen is shielded, all graphic controls of a graphical user interface of an original application, that is, a graphical user interface of an application before the display screen is shielded by an obstruction, are displayed in the display area of the display screen. However, because the display area may be relatively small, all elements of the graphical user interface of the original application are displayed smaller in the display area. Therefore, all graphic controls (such as icons 404, 405, 406, 407 and 408 in FIG. 5 and FIG. 6) in a graphical user interface displayed in the display area are the same as the graphic controls of a graphical user interface displayed when the display screen is not shielded by an obstruction, and only displayed shapes, colors, and the like of the graphic controls may be different because of a different size of the display area. It may be understood that, in the foregoing shielded area.

Therefore, that the foregoing mobile terminal obtains a graphical user interface that matches the display area may include obtaining, according to a size of the display area in the parameter information, a window widget and a graphical user interface of an application that are corresponding to the display area, or obtaining, according to a position of the display area in the parameter information, a window widget and a graphical user interface of an application that are corresponding to the display area. The foregoing are only two examples of obtaining a graphical user interface that matches the display area by the mobile terminal, and another example is not limited in this embodiment.

It can be learned, from a comparison between FIG. 5 and FIG. 6, that a graphical user interface of SMS displayed in the display area in FIG. 6 is much smaller than that in FIG. 5. This is a proper adjustment made without affecting normal use by a user when the display screen of the mobile terminal is shielded, which protects privacy of the user and does not affect user experience.

It may be understood that a graphical user interface displayed in the display area may be a graphical user interface that is of an application and that is displayed on the display screen before the display screen is shielded by an obstruction, or may be a graphical user interface of another application invoked by the mobile terminal.

An application scenario of this embodiment of the present disclosure includes when a user of a mobile terminal views a private message on a display screen of the mobile terminal, another person passes by, the user shields a part of the display screen of the mobile terminal because the user wants to prevent the passerby from seeing the private message. After determining that the display screen is shielded, the mobile terminal determines a display area and a shielded area of the display screen, and displays the private message only in the display area, which prevents leakage of the private message, ensures better security of the mobile terminal, and improves human-machine interaction performance between the mobile terminal and the user.

In this embodiment of the present disclosure, whether a display screen is shielded is determined. When the display screen is shielded, a graphical user interface is displayed in a display area such that the graphical user interface can be displayed only in the display area of the display screen and does not need to be displayed in full screen, which reduces a possibility of information leakage and ensures better privacy.

Figure 7:
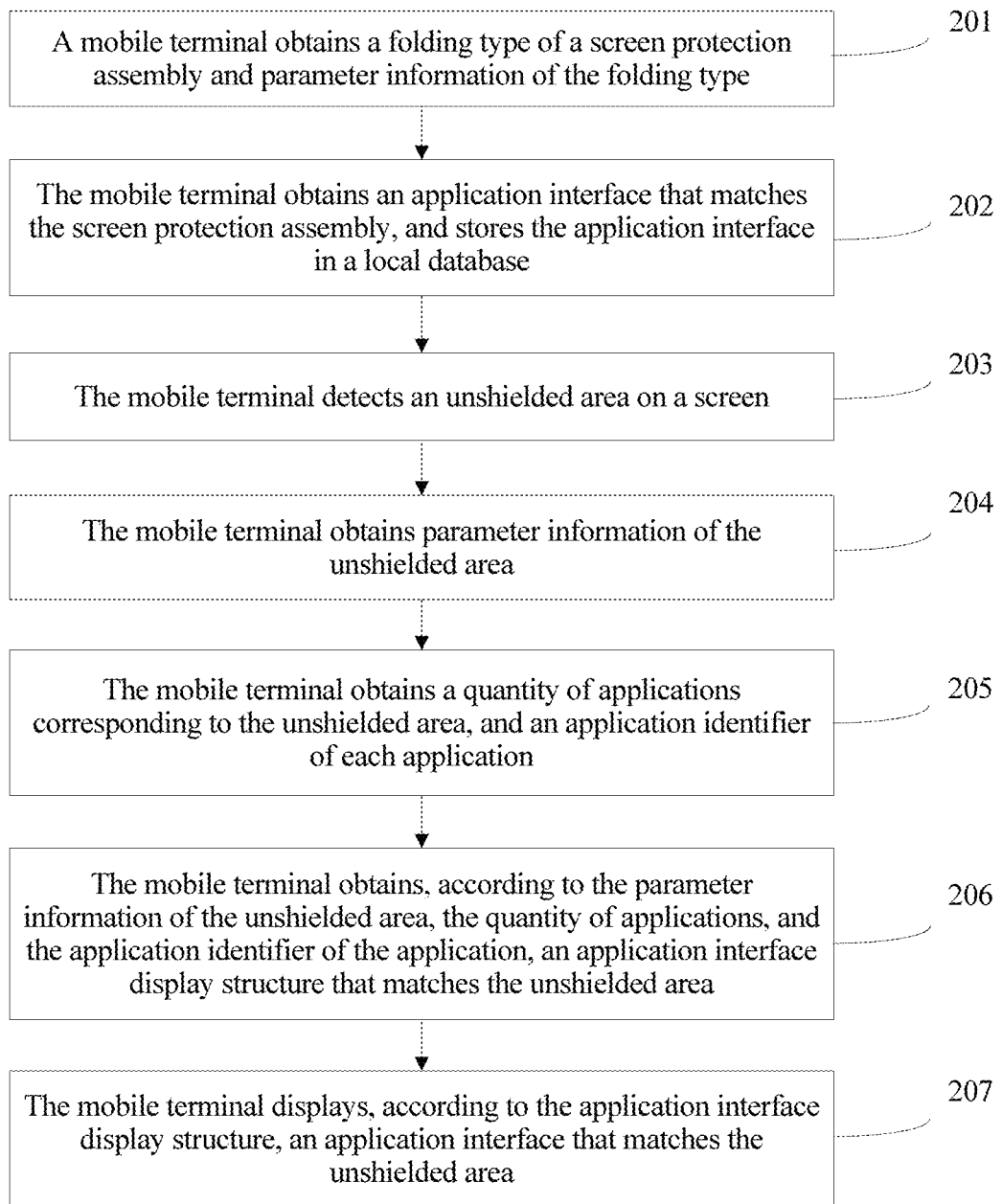
FIG. 7 is a flowchart of a method according to another embodiment of the present disclosure.

Referring to FIG. 7, an embodiment shown in FIG. 7 provides a method for displaying a graphical user interface. The method includes the following steps.

Step 201: A mobile terminal obtains a folding type of a screen protection assembly and parameter information of the folding type.

Step 201 may include either of the following two steps 201a and 201b.

201a. The mobile terminal scans a graphic code of the screen protection assembly, and obtains, using content pointed by a link corresponding to the graphic code, the folding type of the screen protection assembly and the parameter information of the folding type, where the graphic code includes a two-dimensional quick response code and a bar code.

The graphic code of the screen protection assembly may be a download address of the folding type of the screen protection assembly and the parameter information of the folding type. The content pointed by the graphic code is a corresponding folding type of the screen protection assembly and corresponding parameter information of the folding type. The folding type of the screen protection assembly and the parameter information of the folding type may be obtained by scanning the graphic code. The graphic code may be on a packing case of the screen protection assembly, a specification of the screen protection assembly, and the screen protection assembly. Alternatively, the screen protection assembly carries a two-dimensional quick response code attachment such that the user may hang the two-dimensional quick response code attachment on the mobile terminal or a key for reuse by the user.

Further, the user taps an icon of software that has a graphic code scan function in order to trigger an operation instruction to operate the software. After detecting the operation instruction, the mobile terminal starts the software indicated by the instruction and turns on a camera. A graphic code scan area is displayed on the screen, the user adjusts a position between the camera and the graphic code to make the graphic code is completely in the graphic code scan area on the screen. When scanning the graphic code, the mobile terminal processes the graphic code and the graphic code automatically skips to a link pointed by the graphic code. Parameter information of the screen protection assembly and two options "cancel" and "download" are displayed on the screen, and the user taps the "download" option to trigger a download instruction, and downloads the parameter information of the screen protection assembly to the mobile terminal and stores the parameter information of the screen protection assembly in a local database.

201b. The mobile terminal establishes a data connection with the screen protection assembly, and obtains, using the data connection, the folding type of the screen protection assembly and the parameter information of the folding type from the screen protection assembly.

The screen protection assembly includes a storage module, and both the folding type of the screen protection assembly and the parameter information of the folding type are stored in the storage module of the screen protection assembly. To ensure that the mobile terminal can obtain the folding type of the screen protection assembly and the parameter information of the folding type at any time, the screen protection assembly has a communication capability such that the mobile terminal can interact with the screen protection assembly to obtain the folding type of the screen protection assembly and the parameter information of the folding type.

To perform interaction, a manner of establishing the data connection between the mobile terminal and the screen protection assembly may include any one of the following manners (1) to (3).

(1) A parameter information storage module and Near-Field-Communication (NFC) chip are built in the screen protection assembly. The NFC chip of the screen protection assembly communicates with an NFC chip of the mobile terminal to establish the data connection. The screen protection assembly automatically pushes the folding type of the screen protection assembly and the parameter information of the folding type that are stored in the parameter information storage module to the mobile terminal, in addition, the mobile terminal displays the folding type of the screen protection assembly, some parameter information of the folding type, and two options "accept" and "refuse". The user performs an operation on the screen. If the user agrees to obtain the folding type of the screen protection assembly and the parameter information of the folding type, the user taps the "accept" option to trigger a receiving instruction. When detecting the receiving instruction, the mobile terminal starts to receive the folding type of the screen protection assembly and the parameter information of the folding type, and stores the folding type of the screen protection assembly and the parameter information of the folding type in a local database. If the user refuses to obtain the folding type of the screen protection assembly and the parameter information of the folding type, the user taps the "refuse" option to trigger a refusing instruction. When detecting the refusing instruction, the mobile terminal refuses to receive the folding type of the screen protection assembly and the parameter information of the folding type.

(2) The user performs operations on the mobile terminal: tap an icon of a browser on the screen to trigger an instruction for starting the browser, search for an official website of a manufacture of the screen protection assembly in a search bar of the browser, find the screen protection assembly in the official website according to a model of the screen protection assembly, tap the "download" option to trigger a download instruction to download the folding type of the screen protection assembly and the parameter information of the folding type to the mobile terminal and store the folding type of the screen protection assembly and the parameter information of the folding type in a local database.

(3) The user performs operations on the terminal: tap an icon of a browser on the screen to trigger an instruction for starting the browser, and input a link provided in a specification of the screen protection assembly into an address box of the browser. After the link is opened, a compressed package of the folding type of the screen protection assembly and parameter information of the folding type, and two options "accept" and "refuse" are displayed on the screen. If the user agrees to obtain the folding type of the screen protection assembly and the parameter information of the folding type, the user taps the "accept" option to trigger a receiving instruction. When detecting the receiving instruction, the mobile terminal starts to receive the folding type of the screen protection assembly and the parameter information of the folding type, and stores the folding type of the screen protection assembly and the parameter information of the folding type in a local database. If the user refuses to obtain the folding type of the screen protection assembly and the parameter information of the folding type, the user taps the "refuse" option to trigger a refusing instruction. When detecting the refusing instruction, the mobile terminal refuses to receive the folding type of the screen protection assembly and the parameter information of the folding type.

In this embodiment of the present disclosure, the folding type includes a first folding type and a second folding type.

(1) The first folding type is that a screen protection assembly can be folded in a preset manner.

A screen protection assembly of the first folding type can be divided into multiple folding areas, all folding areas are made of rigid materials, and flexible materials are used to connect every two adjacent folding areas. Only a border of every two adjacent folding areas can be folded. When one folding area of the screen protection assembly of the first folding type is folded, only this folding area of the screen protection assembly can be completely opened.

Figure 8:
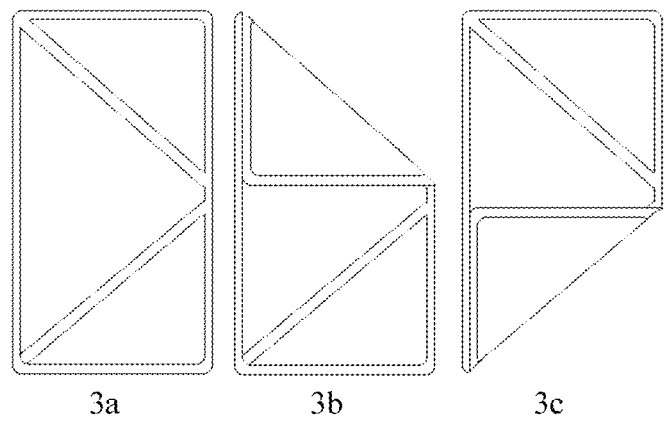
FIG. 8 is a schematic diagram of different folding statuses of a screen protection assembly according to an embodiment of the present disclosure.

For example, referring to FIG. 8, the screen protection assembly is divided into three triangular folding areas: upper, middle, and lower. 3a is a state of an unopened screen protection assembly, 3b is a state of an opened triangular folding area in the upper right corner of the screen protection assembly, 3c is a state of an opened triangular folding area in the lower right corner of the screen protection assembly.

Figure 9:
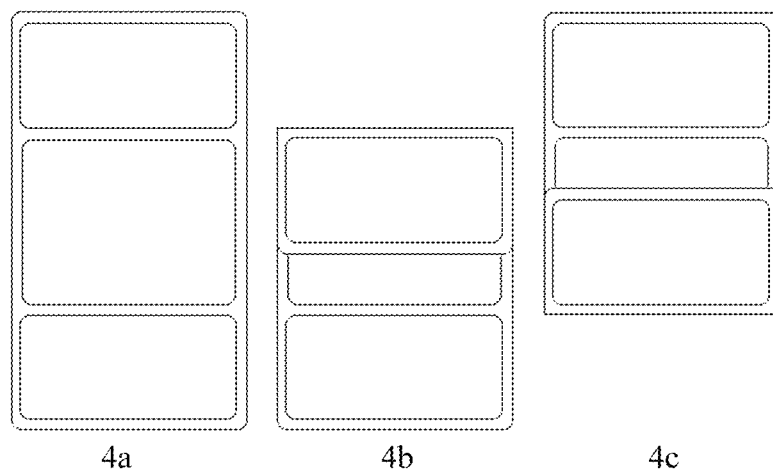
FIG. 9 is a schematic diagram of different folding statuses of another screen protection assembly according to an embodiment of the present disclosure.

Referring to FIG. 9, the screen protection assembly is divided into three rectangular folding areas: upper, middle, and lower. 4a is a state of an unopened screen protection assembly, 4b is a state of a downward-opened rectangular folding area in the upper corner of the screen protection assembly, 4c is a state of an upward-opened rectangular folding area in the lower corner of the screen protection assembly.

(2) The second folding type is that a screen protection assembly can be folded in any manner.

A screen protection assembly of the second folding type is made of flexible materials, and can be folded in any position of the screen protection assembly. A position at which the screen protection assembly is opened and a size of an opened area of the screen protection assembly may be adjusted randomly.

Figure 10:
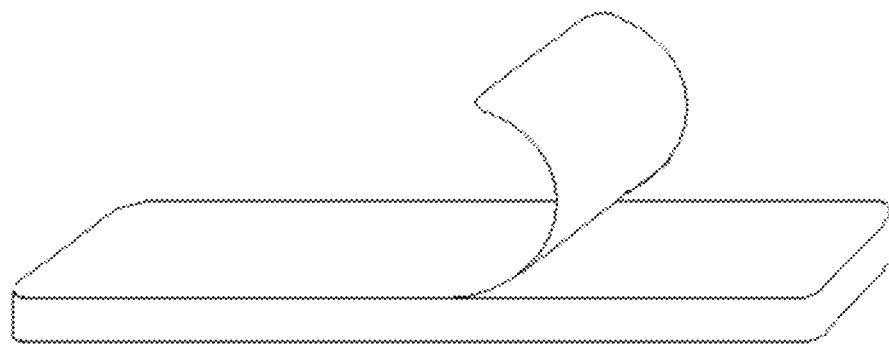
FIG. 10 is a schematic diagram of an opened screen protection assembly according to an embodiment of the present disclosure.

For example, referring to FIG. 10, the screen protection assembly may be randomly coiled or folded. The user may open the screen protection assembly at any position to form an area of any size at the user's discretion.

For the first folding type and the second folding type, parameter information of the first folding type includes position coordinate information of each folding area of the screen protection assembly, and parameter information of the second folding type includes position coordinate information of an area of the screen protection assembly corresponding to the screen.

Step 202: The mobile terminal obtains an application interface that matches the screen protection assembly, and stores the application interface in a local database.

It should be noted that, in a process in which the mobile terminal obtains an application interface that matches the screen protection assembly and stores the application interface in a local database, the mobile terminal establishes a connection with a cloud server, and sends the parameter information of the screen protection assembly to the cloud server. The cloud server screens out, according to the parameter information of the mobile terminal, an application interface that matches the screen protection assembly, and displays, on a screen of the mobile terminal, a thumbnail of the application interface obtained by means of screening. The user selects a required application interface according to the thumbnail of the application interface displayed on the screen, and taps the thumbnail of the application interface to trigger a selection instruction. When detecting the selection instruction, the mobile terminal selects an application interface indicated by the instruction, and then the user taps the "download" option displayed on the screen to trigger a download instruction, and downloads the selected application interface to the mobile terminal and stores the selected application interface in the local database.

Step 203: The mobile terminal detects an unshielded area on a screen.

The mobile terminal may detect the unshielded area using a light sensor, a pressure sensor, or a sensing assembly disposed on a terminal. Further:

(1) When a light sensor is disposed on the mobile terminal, detect, using the light sensor, an area whose light intensity is not less than a third threshold on the screen.

When the screen protection assembly is not opened, the screen is completely covered, in this case, no light shines down on the screen. When an area of the screen protection assembly is opened, external light directly shines down on an area that is not covered by the screen protection assembly. Therefore, a light intensity of the area changes. The light sensor detects the light intensity on the screen. When it is detected that a light intensity of a point or an area on the screen is not less than the third threshold, if the screen protection assembly is of the first folding type, position coordinates of the point or the area whose light intensity is not less than the third threshold and that is on the screen are determined, a folding area in which the point or the area corresponding to the position coordinates is located and that is on the screen protection assembly is determined, and an area that is on the screen and that is corresponding to the folding area is determined as an unshielded area, or if the screen protection assembly is of the second folding type, the point or the area that is on the screen and whose light intensity is not less than the third threshold is determined as an unshielded area.

(2) When a pressure sensor is disposed on the mobile terminal, detect, using a pressure sensor, an area whose pressure is not greater than a fourth threshold on the screen.

Because the screen protection assembly has a specific mass, pressure applied on the screen when the screen protection assembly is not opened is greater than pressure applied on the screen when the screen protection assembly is opened. When an area of the screen protection assembly is opened, pressure applied on the screen changes. The pressure sensor detects a pressure change on the screen. When it is detected a point or an area whose pressure is not greater than the fourth threshold on the screen, if the screen protection assembly is of the first folding type, position coordinates of the point or the area whose pressure is not greater than the fourth threshold and that is on the screen are determined, a folding area in which the point or the area corresponding to the position coordinates is located and that is on the screen protection assembly is determined, and an area that is on the screen and that is corresponding to the folding area is determined as an unshielded area, or if the screen protection assembly is of the second folding type, the point or the area that is on the screen and whose pressure is not greater than the fourth threshold is determined as an unshielded area.

(3) When a sensing assembly is disposed on the screen protection assembly, detect, using the sensing assembly, an area whose angle change is not less than a fifth threshold on the screen protection assembly.

When the screen protection assembly is opened, an area of the screen protection assembly is folded, and an angle between this area and another unfolded area of the screen protection assembly consequently changes. The sensing assembly detects angle change between this area and the unfolded areas of the screen protection assembly, and sends, by means of interaction with the mobile terminal, a detection result to the mobile terminal. When it is detected that an angle between an area and another area is not less than the fifth threshold on the screen protection assembly, if the screen protection assembly is of the first folding type, position coordinates of this area for which an angle between this area and the other area is not less than the fifth threshold on the screen protection assembly are determined, a folding area in which an area corresponding to the position coordinates is located and that is on the screen protection assembly is determined, and an area on the screen corresponding to the folding area is determined as an unshielded area, or if the screen protection assembly is of the second folding type, the area whose angle change is not less than the fifth threshold is determined as an unshielded area.

It may be understood that an unshielded area described in this embodiment of the present disclosure is the display area in the foregoing embodiment.

Step 204: The mobile terminal obtains parameter information of the unshielded area.

After the unshielded area on the screen is determined, if a folding type of the screen protection assembly is of the first folding type, the mobile terminal determines, according to position coordinate information of the unshielded area and folding area information corresponding to the first folding type, folding area information that matches the position coordinate information, and determines the matching folding area information as parameter information of the unshielded area, or if a folding type of the screen protection assembly is of the second folding type, the mobile terminal determines the position coordinate information of the unshielded area on the screen as the parameter information of the unshielded area.

A position, a shape, and a size of the unshielded area may be learned using the position coordinate information of the unshielded area on the screen.

Step 205: The mobile terminal obtains a quantity of applications corresponding to the unshielded area, and an application identifier of each application.

For different unshielded areas, the unshielded areas have different parameter information and therefore may correspond to different quantities of applications and different applications. The quantity of applications corresponding to the unshielded area may be set in two manners:

(1) Parameter information is set for the unshielded area. For all unshielded areas, a quantity of applications corresponding to all unshielded areas is set to a same quantity by default. For example, two applications corresponding to the unshielded area are set by default, and the two applications are set as SMS and contacts by default. When detecting the unshielded area, the terminal obtains application identifiers of the two applications: SMS and contacts.

(2) The mobile terminal recommends, to the user and according to the parameter information of the unshielded area, a proper quantity of applications to be displayed in the unshielded area and all applications that can be displayed in the unshielded area, and the user selects a quantity of applications to be displayed in the unshielded area and a specific application to be displayed. For example, the mobile terminal detects an unshielded area on the screen, and determines, according to parameter information of the unshielded area, that two applications or three applications can be displayed in the unshielded area. At this time, a query box pops up on the screen, and displays two options "two" or "three" to ask the user whether two applications or three applications are required to be displayed in the unshielded area. If two applications are required to be displayed in the unshielded area, the user taps the "two" option to trigger a selection instruction. When detecting the selection instruction, the mobile terminal determines that two applications are to be displayed in the unshielded area. If three applications are required to be displayed in the unshielded area, the user taps the "three" option to trigger a selection instruction. When detecting the selection instruction, the mobile terminal determines that three applications are to be displayed in the unshielded area. After the mobile terminal determines a quantity of applications to be displayed in the unshielded area, application identifiers of all applications that can be displayed in the unshielded area are displayed on the screen. The user may select and determine, from all application identifiers displayed in the unshielded area, an application that is consistent with the quantity of applications to be displayed in the unshielded area, and tap an application identifier corresponding to the application that is required to be displayed in the unshielded area to trigger a selection instruction. When detecting the selection instruction, the mobile terminal determines an application corresponding to the selected application identifier as an application to be displayed in the unshielded area.

Step 206: The mobile terminal obtains, according to the parameter information of the unshielded area, the quantity of applications, and the application identifier of the application, an application interface display structure that matches the unshielded area.

If the user selects one application for displaying in the unshielded area, the unshielded area is directly used as a display area of the application.

If the user selects multiple applications for displaying in the unshielded area, the unshielded area is divided into multiple display areas whose quantity is the same as that of applications to be displayed. Each display area corresponds to one application, and a size of each display area is adjusted according to a shape and a size of an application identifier of each application in order to ensure that when an application identifier is displayed in a corresponding display area, the application identifier of each application may be clearly displayed.

Step 207: The mobile terminal displays, according to the application interface display structure, a graphical user interface of an application that matches the unshielded area.

An application interface that matches the unshielded area is obtained from a local database according to the application interface display structure, and the application interface is displayed on the screen, or a graphical user interface of an application that matches the unshielded area is generated according to the application interface display structure, and the graphical user interface of the application is displayed on the screen.

Figure 11:
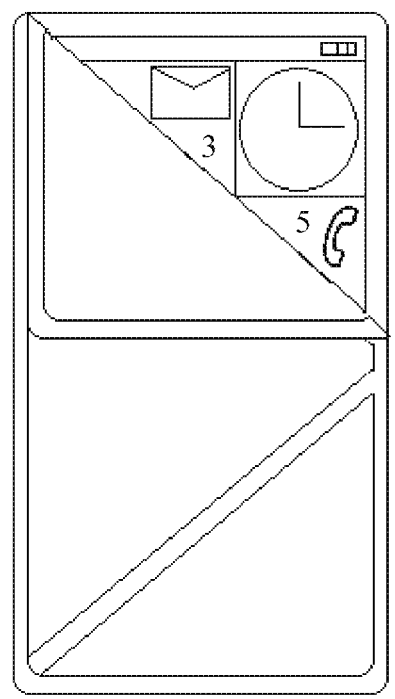
FIG. 11 is a schematic diagram of a graphical user interface of a mobile terminal according to an embodiment of the present disclosure.

For example, referring to FIG. 11, application identifiers of three applications are displayed in the unshielded area in the figure: time, SMS, and call records. A number 3 displayed in a lower corner of an SMS identifier is a quantity of unread SMS messages, and a number 5 displayed in a left corner of an identifier of call records is a quantity of missed calls.

Figure 12:
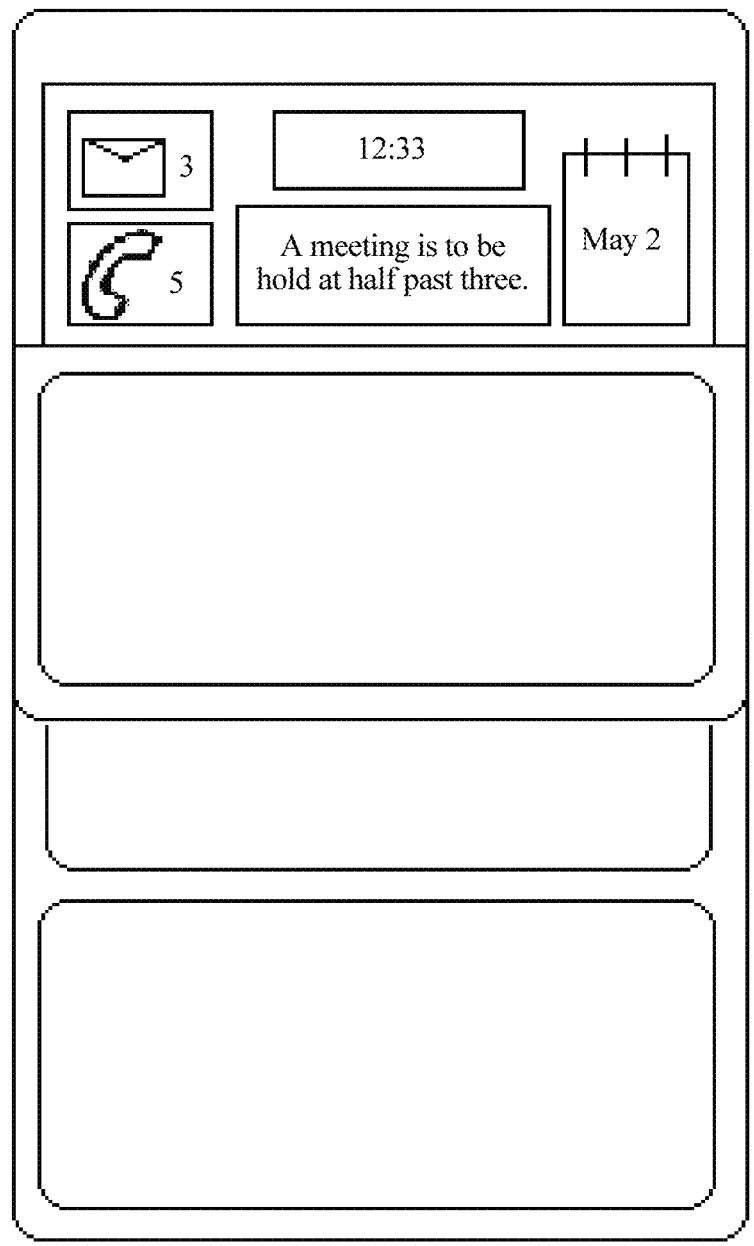
FIG. 12 is a schematic diagram of another graphical user interface of a mobile terminal according to an embodiment of the present disclosure.

Referring to FIG. 12, application identifiers of five applications are displayed in the unshielded area in the figure: time, SMS, call records, calendar, and event reminder. A number 1 displayed in an upper right corner of an SMS identifier is a quantity of unread SMS messages, a number 7 displayed in an upper right corner of an identifier of call records is a quantity of missed calls, an identifier of the event reminder is in a lower corner of an identifier of time, and content of an event is displayed on an identifier of event reminder.

In this embodiment of the present disclosure, an application interface that matches a screen is obtained and stored in a local database, and an unshielded area on the screen is detected. An application interface that matches the unshielded area is obtained or automatically generated in the local database according to parameter information of the unshielded area such that a proper graphical user interface of an application can be displayed according to a size of the unshielded area and does not need to be displayed in full screen, which ensures better flexibility, reduces a possibility of information leakage, and ensures better privacy.

In this embodiment, a mobile phone is used as an example for a detailed description of this embodiment of the present disclosure.

It should be understood that a mobile phone 100 shown in a figure is merely an example of a mobile terminal, and the mobile phone 100 may have more or less components than those shown in the figure, and may combine two or more components or have different component configurations. Various components shown in the figure may be implemented in hardware that includes one or more signal processing circuits and/or application-specific integrated circuits, software, or a combination of hardware and software.

Figure 13:
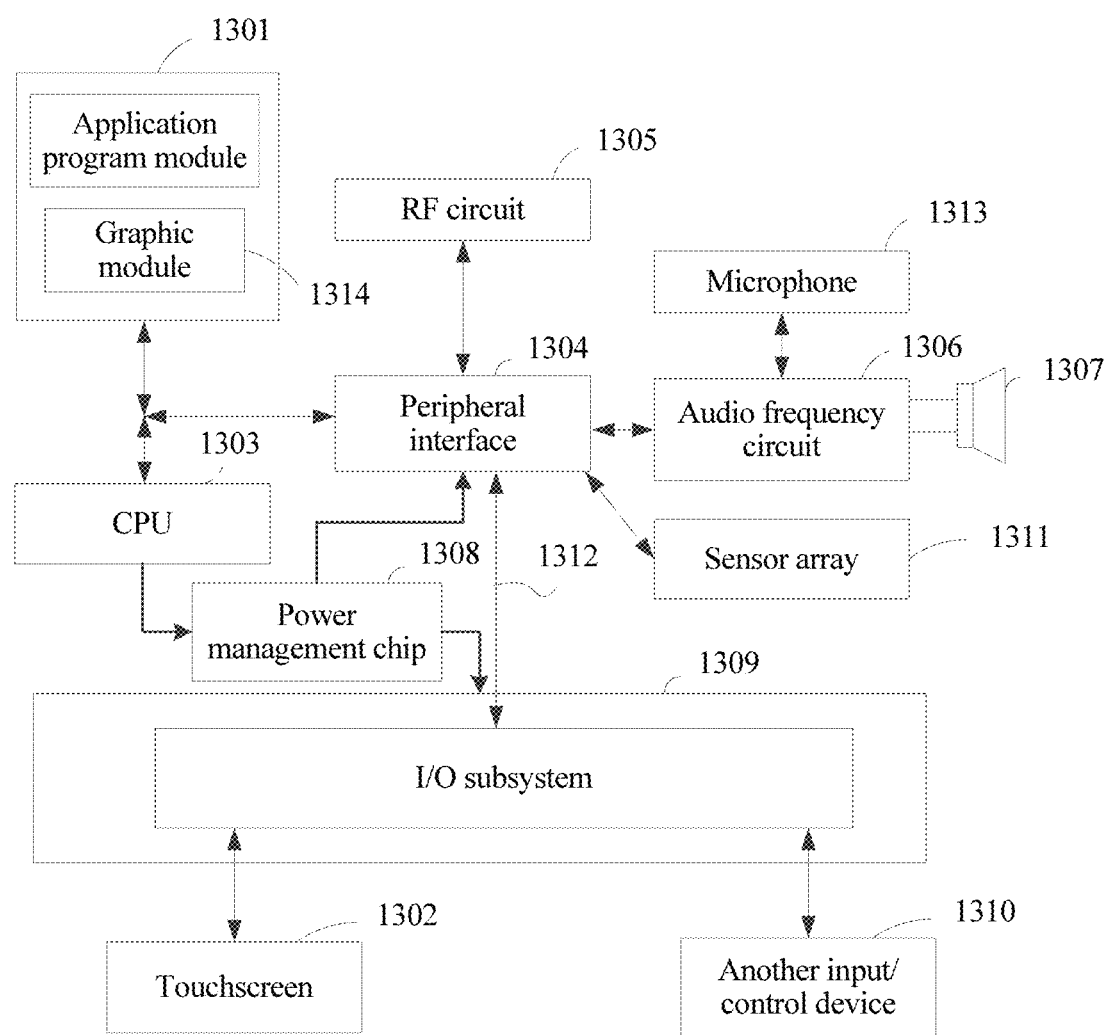
FIG. 13 is a schematic diagram of a structure of a mobile phone according to an embodiment of the present disclosure.

Herein, the mobile phone is used as an example for specific description. FIG. 13 is a schematic diagram of a structure of a mobile phone for displaying a graphical user interface according to an embodiment of the present disclosure. As shown in FIG. 10, the mobile phone includes a memory 1301, a touchscreen 1302, a CPU 1303, a peripheral interface 1304, an radio frequency (RF) circuit 1305, an audio frequency circuit 1306, a speaker 1307, a power management chip 1308, an input/output (I/O) subsystem 1309, another I/O device 1310, a sensor array 1311, and a microphone 1313. These components communicate using one or more communications buses or signal cables 1312.

The following provides a detailed description of each component of the mobile phone for displaying a graphical user interface provided in this embodiment.

The memory 1301 is configured to store a software program or a software module. By running the software program stored in the memory 1301, the CPU 1303 executes various functions or applications and data processing of the mobile phone 100. The memory 1301 may primarily include a program storage area and a data storage area, where the program storage area may store an operating system, and an application program required by at least one function (such as an audio play function or a video play function), and the like, and the data storage area may store data (such as audio data or a phonebook) created according to use of the mobile phone 100, and the like. In addition, the memory 1301 may include a high-speed random access memory, and may also include a non-volatile memory, for example, at least one magnetic disk storage device, a flash memory device, or another volatile solid-state storage device.

The peripheral interface 1304 may couple input and output peripherals of the mobile phone to the CPU 1303 and the memory 1301. One or more CPU 1303s run or execute various software programs or instruction sets that are stored in the memory 1301 in order to implement various functions and data processing of the mobile phone 100.

The RF circuit 1305 may be configured to receive and send information, or receive and send an electrical signal in a call process. In particular, after receiving downlink information of a base station, the RF circuit 1305 sends the downlink information to the CPU 1303 for processing. In addition, the RF circuit 1305 sends related uplink data to the base station. Generally, the RF circuit 1305 includes but is not limited to an antenna, at least one amplifier, a transceiver, a coupler, a low noise amplifier, and a duplexer. In addition, the RF circuit 1305 may further communicate with a network and another device by means of wireless communication. The wireless communication may use any communications standard or protocol, including but not limited to Global System of Mobile communication (GSM), General Packet Radio Service (GPRS), code-division multiple access (CDMA), wideband CDMA (WCDMA), Long-Term Evolution (LTE), an email, an SMS, and the like.

The touchscreen 1302 may be configured to collect a touch operation (such as an operation performed by a user on the touchscreen 1302 or near the touchscreen 1302 using any proper object or accessory, such as a finger or a stylus) on or near the touchscreen 1302, and starts a corresponding connected apparatus according to a preset program. Optionally, the touchscreen 1302 may include two parts: a touch panel and a touch controller. The touch panel detects a touch location of a user, detects a signal brought by the touch operation, and sends the signal to the touch controller. The touch controller receives touch information from the touch panel, converts the touch information into touch point coordinates, sends the touch point coordinates to the CPU 1303, and can receive and execute a command sent by the CPU 1303. In addition, multiple types of touch panels, such as a resistive type, a capacitive type, infrared, and a surface acoustic wave, may be implemented for the touchscreen 1302.

In addition, the touchscreen 1302 may further be configured to display information input by the user or information provided for the user and various menus of the mobile phone 100. Therefore, the touchscreen 1302 may further include a display panel. Optionally, the display panel may be configured in a form of a liquid crystal display (LCD), an organic light-emitting diode (OLED), or the like.

Further, the touch panel may cover the display panel. When detecting a touch operation on or near the touch panel, the touch panel transmits the touch operation to the CPU 1303 to determine a type of a touch event, and then the CPU 1303 provides corresponding visual output on the display panel according to the type of the touch event.

The mobile phone 100 may further include at least one type of sensor array 1311, such as a light sensor, a pressure sensor, a motion sensor, or another sensor. Further, a light sensor may include an ambient light sensor and a proximity sensor. The ambient light sensor may adjust luminance of the touchscreen 1302 according to brightness or dimness of ambient light, and the proximity sensor may turn off display of the touchscreen 1302 when the mobile phone 100 approaches an ear. As a type of the motion sensor, an accelerometer sensor may detect an acceleration value in each direction (generally three axes), and detect a value and a direction of gravity when the acceleration sensor is stationary, and is applicable to an application used for recognizing a mobile phone posture (for example, switching of a screen between a landscape orientation and a portrait orientation, a related game, and magnetometer posture calibration), a function related to vibration recognition (such as a pedometer or a knock), and the like. Other sensors such as a gyroscope, a barometer, a hygrometer, a thermometer, and an infrared sensor may also be disposed on the mobile phone 100. Details are not described herein.

The sensor array 1311 described in this embodiment may be one sensor, or may be a combination of multiple sensors, and may be one type of sensor, or may be a combination of multiple types of sensors.

An audio frequency circuit 1306, a speaker 1307, and a microphone 1313 may provide audio interfaces between the user and the mobile phone 100. The audio frequency circuit 1306 may transmit an electrical signal obtained after received audio data is converted to the speaker 1307, and the speaker 1307 converts the electrical signal into a voice signal for output. In addition, the microphone 1313 converts a collected voice signal into an electrical signal, the audio frequency circuit 1306 receives the electrical signal, converts the electrical signal into audio data, and outputs the audio data to the RF circuit 1305 in order to send the audio data, for example, to another mobile phone, or output the audio data to the memory 1301 for further processing after being invoked by the CPU 1303.

The CPU 1303 is a control center of the mobile phone 100, and uses various interfaces and lines to connect all parts of the entire mobile phone. By running or executing a software program or an instruction set that is stored in the memory 1301 and invoking data stored in the memory 1301, the CPU executes various functions and data processing of the mobile phone 100 in order to perform overall monitoring on the mobile phone. Optionally, the CPU 1303 may include one or more processing units. An application processor and a modem processor may be integrated into the CPU 1303, where the application processor primarily handles an operating system, a user interface, an application program, and the like, and the modem processor primarily handles wireless communication. It may be understood that the foregoing modem processor may not be integrated into the CPU 1303.

The mobile phone 100 further includes a power supply (such as a battery) that supplies power to each part. The power supply may be logically connected to the CPU 1303 using the power management chip 1308 in order to implement functions, such as management of charging, discharging, and power consumption control, using the power management chip 1308.

Although not shown, the mobile phone 100 may further include a camera, a short-distance communications module (for example, BLUETOOTH and NFC), and the like. Details are not described herein.

In this embodiment of the present disclosure, the sensor array 1311 is disposed on a frame of the mobile phone 100 that is on a same side with the touchscreen 1302. Further, the sensor array 1311 may be a light sensor array including the light sensors 204*a* to 204*h* shown in FIG. 2, or may be a pressure sensor array. The CPU 1303 determines, according to a voltage change of sensed data collected by the sensor array 1311, whether the touchscreen 1302 of the mobile phone is shielded by an obstruction in order to determine a shielded part and an unshielded part that are of the touchscreen 1302. A specific determining method is described in detail in the foregoing embodiment. Details are not described herein again.

"Shield" means that a part of the touchscreen of the mobile phone is covered by an obstruction, which causes a case in which the user cannot see covered display content. For example, a display area of 30% of a touchscreen of a tablet computer is covered by a book, or a display area of 40% of a display screen of a mobile phone is covered by a palm (one palm or two palms) of a user, which may be considered that the touchscreen 1302 of the mobile phone is shielded by an obstruction (such as a book or a palm). Certainly, in a normal operation process of the mobile phone, the user uses a finger to tap the touchscreen or slide on the touchscreen. This normal operation essentially makes a part of the touchscreen of the mobile phone covered by a moving figure. This embodiment may also include this case. However, it may be understood that to distinguish the normal operation (such as tap or slide) performed on the touchscreen by a figure of the user, a preset threshold may be set in the mobile phone. When an area of the touchscreen of the mobile phone covered by an obstruction exceeds the preset threshold, the mobile phone may determine that the touchscreen is shielded.

When the CPU 1303 determines that a part of the touchscreen 1302 is shielded by an obstruction, the CPU 1303 determines a shielded area and a display area of the touchscreen 1302. The shielded area of the touchscreen refers to an area of the touchscreen that is covered by an obstruction, and the display area of the touchscreen refers to an area of the touchscreen that is not covered by the obstruction. For example, in FIG. 4, a shielded area of the touchscreen is the area 201-1 of the touchscreen indicated by a dashed line in the figure, and a display area of the touchscreen is the area 201-2 of the touchscreen that is not shielded by the obstruction 301 (that is, the remaining area of the touchscreen except the area indicated by a dashed line in FIG. 4). It may be understood that the area 201-1 and the area 201-2 is a sum of areas of graphical user interfaces displayed on the touchscreen to the user when the display screen is in a normal state (for example, the display screen is not shielded by an obstruction). The display area is used to display a graphical user interface.

If the CPU 1303 determines that the touchscreen 1302 is shielded, the CPU 1302 invokes, according to parameter information of the determined display area (such as a size of the display area and a position of the display area in the touchscreen), a graphical user interface that matches the parameter information in a graphic module 1314 of the memory 1301, and displays the graphical user interface using the touchscreen 1302. That the foregoing CPU 1302 invokes the graphical user interface that matches the display area may include obtaining, by the CPU 1302 according to a size of the display area in the parameter information, a graphical user interface of a window widget or an application, where the graphical user interface of the application corresponds to the size of the display area, or obtaining, according to a position of the display area in the parameter information, a graphical user interface of a window widget or an application, where the window widget or the application corresponds to the position of the display area.

In this embodiment of the present disclosure, whether a touchscreen of a mobile phone is shielded is determined. When the touchscreen is shielded, a graphical user interface is displayed in a display area such that the graphical user interface can be displayed only in the display area of the display screen and does not need to be displayed in full screen, which reduces a possibility of information leakage and ensures better privacy.

Another embodiment of the present disclosure provides a graphical user interface used for displaying on a display screen of a mobile terminal, and the graphical user interface includes a first graphical user interface and a second graphical user interface, where the first graphical user interface of an application is displayed in full screen on the display screen, and when it is detected that the display screen is shielded by an obstruction, the second graphical user interface of the application is displayed in a display area of the display screen, where the display area is an area of the display screen that is not shielded by the obstruction, and quantities of graphic controls of the first graphical user interface and graphic controls of the second graphical user interface are the same.

Another embodiment of the present disclosure discloses a mobile terminal, where the mobile terminal includes a display screen, and the mobile terminal further includes a judging module configured to determine whether the display screen of the mobile terminal is shielded, a determining module configured to when the judging module determines that the display screen is shield, determine a shielded area and a display area of the display screen, where the display area is used to display a graphical user interface, and the determining module is further configured to determine parameter information of the display area, where the parameter information includes an area size of the display area and a position of the display area in the display screen, and a display module configured to obtain, according to the parameter information in the determining module, a graphical user interface that matches the display area, and display the graphical user interface in the display area.

The mobile terminal further includes a sensor module that is connected to the judging module, and that the judging module determines whether the display screen of the mobile terminal is shielded may include detecting, by the sensor module, an ambient light intensity, and determining, by the judging module, whether the display screen is shielded according to whether a change value of the ambient light intensity is greater than a preset change threshold.

That the determining module determines the shielded area and the display area of the display screen includes determining, by the determining module, an area whose ambient light intensity is greater than or equal to a preset first threshold and that is in the display screen as a display area, and determining an area whose ambient light intensity is less than the preset first threshold and that is in the display screen as a shielded area.

A graphical user interface displayed in the display area may be a graphical user interface that is of an application and that is displayed on the display screen before the display screen is shielded.

It may be understood that a mobile terminal in this embodiment of the present disclosure may be configured to execute the technical solution of the foregoing method embodiment.

An embodiment of the present disclosure further provides a mobile terminal. The mobile terminal includes one or more processors, a display, a storage apparatus, and one or more programs. The one or more programs are stored in the storage apparatus and are configured to be executed by the one or more processors, and the one or more programs include determining whether the display is shielded, when the display is shielded, determining a shielded area and a display area of the display, where the display area is used to display a graphical user interface, determining parameter information of the display area, where the parameter information includes an area size of the display area and a position of the display area in the display, and obtaining, according to the parameter information, a graphical user interface that matches the display area, and displaying the graphical user interface in the display area.

In the foregoing embodiments, the display screen, the screen, the touchscreen, and the display may refer to a same device, and the device includes the display panel and the touch panel described in the foregoing embodiments.

A person of ordinary skill in the art may understand that all or a part of the steps of the embodiments may be implemented by hardware or a program instructing relevant hardware. The program may be stored in a computer readable storage medium. The storage medium may include a read-only memory, a magnetic disc, or an optical disc.

The foregoing descriptions are merely exemplary embodiments of the present disclosure, and are not intended to limit the present disclosure. Any modification, equivalent replacement, or improvement made without departing from the spirit and principle of the present disclosure should fall within the protection scope of the present disclosure.

The invention claimed is:
1. A mobile terminal comprising:
a touchscreen;
at least two sensors;
a memory configured to store instructions; and
a processor coupled to the touchscreen, the at least two sensors, and the memory, wherein the instructions cause the processor to be configured to:
display a first graphical user interface (GUI) of a first application on the touchscreen;
determine whether the touchscreen is shielded based on the at least two sensors;
determine a first area and a second area of the touchscreen when the touchscreen is shielded, wherein the first area does not display a first content, and wherein the second area displays the first content;

determine parameter information of the second area, wherein the parameter information comprises an area size of the second area and a position of the second area on the touchscreen;

obtain, according to the area size and the position, a second GUI of a second application invoked by the mobile terminal, wherein the second GUI matches the area size and the position; and display the second GUI in the second area.

2. The mobile terminal of claim 1, wherein the at least two sensors comprise one or more light sensors coupled to the processor and configured to obtain a change value of a first ambient light intensity, and wherein the instructions further cause the processor to be configured to determine whether the touchscreen is shielded based on whether the change value of the first ambient light intensity is greater than a preset change threshold.

3. The mobile terminal of claim 2, wherein the instructions further cause the processor to be configured to:

determine an area comprising a second ambient light intensity that is greater than or equal to a preset first threshold as the second area; and determine an area comprising a third ambient light intensity that is less than the preset first threshold as the first area.

4. The mobile terminal of claim 1, wherein the at least two sensors comprise a pressure sensor array coupled to the processor and configured to determine a first pressure value applied on the touchscreen, and wherein the instructions further cause the processor to be configured to determine whether the touchscreen is shielded based on whether the first pressure value is greater than a preset pressure threshold.

5. The mobile terminal of claim 4, wherein the instructions further cause the processor to be configured to:

determine an area comprising a second pressure value that is applied on the touchscreen is greater than or equal to a preset second threshold as the first area; and determine an area comprising a third pressure value that is applied on the touchscreen is less than the preset second threshold as the second area.

6. The mobile terminal of claim 1, wherein the instructions further cause the processor to be configured to display, on the touchscreen, a second content of the first GUI before the touchscreen is shielded.

7. The mobile terminal of claim 1, wherein before determining whether the touchscreen is shielded, the instructions further cause the processor to be configured to detect whether the touchscreen is lighted up.

8. A method for displaying graphical user interfaces (GUIs), wherein the method comprises:

displaying, by a display of a mobile terminal, a first GUI of a first application in the display;

determining, by a processor of the mobile terminal, whether the display is shielded based on at least two sensors of the mobile terminal;

determining, in response to the determining that the display is shielded, a first area and a second area of the display, wherein the first area does not display a first content, and wherein the second area displays the first content;

determining, by the processor, parameter information of the second area, wherein the parameter information comprises an area size of the second area and a position of the second area in the display;

obtaining, by the processor according to the area size and the position of the second area, a second GUI of a second application invoked by the mobile terminal, wherein the second GUI matches the area size and the position of the second area; and displaying, by the display, the second GUI in the second area.

9. The method of claim 8, further comprising:

obtaining, by one or more light sensors of the mobile terminal, a change value of a first ambient light intensity; and determining, by the processor, whether the display is shielded based on whether the change value of the first ambient light intensity is greater than a preset change threshold.

10. The method of claim 9, further comprising:

determining, by the processor, an area comprising a second ambient light intensity that is greater than or equal to a preset first threshold as the second area; and determining, by the processor, an area comprising a third ambient light intensity that is less than the preset first threshold as the first area.

11. The method of claim 8, further comprising:

detecting, by a pressure sensor array of the mobile terminal, a first pressure value applied on the display; and determining, by the processor, whether the display is shielded based on whether the first pressure value is greater than a preset pressure threshold.

12. The method of claim 11, further comprising:

determining, by the processor, an area comprising a second pressure value that is applied on the display is greater than or equal to a preset second threshold as the first area; and determining, by the processor, an area comprising a third pressure value that is applied on the display is less than the preset second threshold as the second area.

13. The method of claim 8, further comprising displaying, by the display, a second content of the first GUI on the display before the display is shielded.

14. The method of claim 8, wherein before determining whether the display is shielded, the method further comprises detecting whether the display is lighted up.

15. A computer program product comprising computer-executable instructions stored on a non-transitory computer-readable storage medium that, when executed by a processor, cause a mobile terminal to:

display a first graphical user interface (GUI) of a first application in a display of the mobile terminal;

determine a first area and a second area of the display when the display is shielded based on at least two sensors of the mobile terminal, wherein the first area does not display a first content, and wherein the second area displays the first content;

determine parameter information of the second area, wherein the parameter information comprises an area size of the second area and a position of the second area in the display;

obtain, according to the area size and the position of the second area, a second GUI of a second application invoked by the mobile terminal, wherein the second GUI matches the area size and the position of the second area; and display the second GUI in the second area.

16. The computer program product of claim 15, wherein the at least two sensors comprise one or more light sensors coupled to the processor, and wherein the computer-executable instructions further cause the mobile terminal to:

obtain, using the one or more light sensors, a change value of a first ambient light intensity; and determine whether the display is shielded based on whether the change value of the first ambient light intensity is greater than a preset change threshold.

17. The computer program product of claim 16, wherein the computer-executable instructions further cause the mobile terminal to:
   determine an area comprising a second ambient light intensity that is greater than or equal to a preset first threshold as the second area; and
   determine an area comprising a third ambient light intensity that is less than the preset first threshold as the first area.

18. The computer program product of claim 15, wherein the mobile terminal further comprises a pressure sensor array coupled to the processor, and wherein the computer-executable instructions further cause the mobile terminal to:
   detect, using the pressure sensor array, a first pressure value applied on the display; and
   determine whether the display of the mobile terminal is shielded based on whether the first pressure value is greater than a preset pressure threshold.

19. The computer program product of claim 18, wherein the computer-executable instructions further cause the mobile terminal to:
   determine an area comprising a second pressure value that is applied on the display is greater than or equal to a preset second threshold as the first area; and
   determine an area comprising a third pressure value that is applied on the display is less than the preset second threshold as the second area.

20. The computer program product of claim 15, wherein the computer-executable instructions further cause the mobile terminal to display, on the display, a second content of the first GUI before the display is shielded.

* * * * *